(12) United States Patent
Shiimori

(10) Patent No.: US 6,567,983 B1
(45) Date of Patent: May 20, 2003

(54) ELECTRONIC ALBUM PRODUCING AND VIEWING SYSTEM AND METHOD

(75) Inventor: Yoshiko Shiimori, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/289,680

(22) Filed: Apr. 12, 1999

(30) Foreign Application Priority Data

Apr. 10, 1998 (JP) ............................................ 10-116248

(51) Int. Cl.[7] ........................ H04N 7/173; G06F 15/16
(52) U.S. Cl. ........................ 725/105; 709/203; 709/236
(58) Field of Search ................................. 725/105, 117, 725/135–139; 345/731–733; 709/203, 213, 216

(56) References Cited

U.S. PATENT DOCUMENTS

| 5,029,112 | A | | 7/1991 | Sakamoto et al. | |
|---|---|---|---|---|---|
| 5,493,677 | A | | 2/1996 | Balogh et al. | |
| 5,550,735 | A | * | 8/1996 | Slade et al. | 364/401 |
| 5,740,388 | A | * | 4/1998 | Hunt | 395/328 |
| 5,999,968 | A | * | 12/1999 | Tsuda | 709/213 |
| 6,085,249 | A | * | 7/2000 | Wang et al. | 709/229 |
| 6,111,586 | A | * | 8/2000 | Ikeda et al. | 345/433 |
| 6,237,010 | B1 | * | 5/2001 | Hui et al. | 707/502 |
| 6,292,619 | B1 | * | 9/2001 | Fujita et al. | 386/52 |
| 6,301,586 | B1 | * | 10/2001 | Yang et al. | 707/104 |
| 6,307,550 | B1 | * | 10/2001 | Chen et al. | 345/418 |
| 6,324,545 | B1 | * | 11/2001 | Morag | 707/202 |
| 6,332,146 | B1 | * | 12/2001 | Jebens et al. | 707/104 |
| 6,437,797 | B1 | * | 8/2002 | Ota | 345/638 |

FOREIGN PATENT DOCUMENTS

| EP | WO 97/09681 | 3/1997 |
|---|---|---|
| EP | 0889636 A2 | 1/1999 |
| JP | 9-305784 | 11/1997 |

OTHER PUBLICATIONS

European Search Report dated Nov. 24, 2000.

* cited by examiner

Primary Examiner—John Miller
Assistant Examiner—Annan Q. Shang
(74) Attorney, Agent, or Firm—McGinn & Gibb, PLLC

(57) ABSTRACT

An electronic album is produced and viewed between a client computer 1 and an image server 30 capable of establishing data communication with each other. An electronic album file for viewing the electronic album is produced in the client computer 1, and is transmitted to the image server 30. The electronic album file is managed in the image server 30, and is transmitted to the client computer 1 which issues a request to view the electronic album. In the client computer 1, the viewing of the electronic album becomes possible.

22 Claims, 23 Drawing Sheets

BACKGROUND IMAGE

MASK IMAGE

Fig. 7

FRAME LAYOUT FILE

```
FileName                                      # FILE NAME OF FRAME LAYOUT FILE
Frame="http://FrameServer/Frame1.jpg"         # PATH TO BACKGROUND IMAGE
[UserImage]
UsrImgCnt=2       # NUMBER OF USER IMAGES SYNTHESIZED ON FRAME
UsrImg="http://ImageServer/Usr/Image1.jpg"[,  # PATH TO USER IMAGE
        "http://ImageServer/Usr/Image2.jpg"]
MaskImg="http://MaskServer/Mask1.jpg"[,]      # PATH TO MASK IMAGE (ONLY WHEN MASK IS USED)
[ClipArt]
ClipArtCnt=1                                  # NUMBER OF CLIP ARTS SYNTHESIZED ON FRAME
ClipArtFile="http://ClipArtServer/Image1.jpg" # PATH TO CLIP ART
[Text]
TextCnt=1         # NUMBER OF TEXTS SYNTHESIZED ON FRAME
TextFile="http://AlbumServer/Uer/Text1.txt",  # PATH TO TEXT
[Object]
ObjectCnt=5   # TOTAL NUMBER OF OBJECTS (BACKGROUND IMAGE/USER IMAGE/CLIP ART/TEXT)ON FRAME
ObjectID=00[,10[,11[,20[,30]]]]               # ID ASSIGNED TO OBJECT
[DisplayEffect]
ViewType=1[,4[,4[,2[,1]]]]                    # DISPLAY EFFECT FOR OBJECT
                                                (CORRESPONDING TO ORDER OF Object IDs)
ViewOrder=1[,3[,2[,5[,4]]]]                   # ORDER IN WHICH OBJECTS ARE DISPLAYED
[Region]                                        (CORRESPONDING TO ORDER OF Object IDs)
Region=0.0,0.0,1.0,1.0[,1.0,1.3,4.6,4.8,[,    # POSITION WHERE OBJECT IS DISPLAYED
       7.4,4.6,9.1,6.7[,…[,…[,…]]]]             (CORRESPONDING TO OREDER OF Object IDs)
Aspect=0.6
```

Fig. 8

| ID | DISPLAY EFFECT |
|---|---|
| 1 | SLIDE IN (FROM THE RIGHT) |
| 2 | SLIDE IN (FROM THE BOTTOM) |
| 3 | SLIDE IN (FROM THE LEFT) |
| 4 | SLIDE IN (FROM THE TOP) |
| 5 | SLIDE IN (FROM THE UPPER RIGHT) |
| 6 | SLIDE IN (FROM THE UPPER LEFT) |
| 7 | SLIDE IN (FROM THE LOWER RIGHT) |
| 8 | SLIDE IN (FROM THE LOWER LEFT) |
| 9 | BLIND (LENGTH) |
| 10 | BLIND (WIDTH) |
| 11 | BOX WIPE OUT |
| 12 | BOX WIPE IN |
| 13 | CHECKER WIPE (LENGTH) |
| 14 | CHECKER WIPE (WIDTH) |
| 15 | DISSOLVE |
| 16 | FLASH |
| 17 | RANDOM STRIPE (LENGTH) |
| 18 | RANDOM STRIPE (WIDTH) |
| 19 | SPRIT WIPE OUT (LENGTH) |
| 20 | SPRIT WIPE OUT (WIDTH) |
| 21 | SPRIT WIPE IN (LENGTH) |
| 22 | SPRIT WIPE IN (WIDTH) |
| 23 | WIPE (LONGITUDINALLY UPWARD TO THE RIGHT) |
| 24 | WIPE (LONGITUDINALLY UPWARD TO THE LEFT) |
| 25 | WIPE (LONGITUDINALLY DOWNWARD TO THE RIGHT) |
| 26 | WIPE (LONGITUDINALLY DOWNWARD TO THE LEFT) |
| 27 | WIPE (LATERALLY UPWARD TO THE RIGHT) |
| 28 | WIPE (LATERALLY UPWARD TO THE LEFT) |
| 29 | WIPE (LATERALLY DOWNWARD TO THE RIGHT) |
| 30 | WIPE (LATERALLY DOWNWARD TO THE LEFT) |
| 31 | WIPE (UPWARD) |
| 32 | WIPE (DOWNWARD) |
| 33 | WIPE (LEFTWARD) |
| 34 | WIPE (RIGHTWARD) |
| 35 | RANDOM |

Fig. 11a

ELECTRONIC ALBUM FILE

| | |
|---|---|
| FileName | # FILE NAME OF ELECTRONIC ALBUM FILE |
| ViewTime=60 | # ALBUM DISPLAY TIME (SEC) |
| [Frame] | |
| FrameCnt=2 | # TOTAL NUMBER OF FRAMES |
| FrameLayout="http://AlbumServer/Usr/Page1.frm"[ | # PATH TO FrameLayoutFile |
|     "http://AlbumServer/Usr/Page2.frm"] | (ORDER OF DISPLAY) |
| FrameTimer=30[30] | # DISPLAY TIME FOR EACH FRAME (SEC) |
| [Music] | |
| MusicCnt=2 | # NUMBER OF SOUND EFFECT FILES |
| MusicInfFile="http://MusicServer/MusicInfFile1.txt"[ | # PATH TO MUSIC INFORMATION |
|     "http://MusicServer/MusicInfFile2.txt"] | FILE (ORDER OF PLAY) |

Fig. 11b

MUSIC INFORMATION FILE

| | |
|---|---|
| FileName | # FILE NAME OF MUSIC INFORMATION FILE |
| MusicFile="http://MusicServer/Music2.wav" | # PATH TO SOUND EFFECT FILE |
| StartPoint=0 | # POSITION WHERE PLAY STARTS IN MUSIC FILE (SEC) |
| EndPoint=20 | # POSITION WHERE PLAY ENDS IN MUSIC FILE (SEC) |
| Repeat=2 | # NUMBER OF TIMES OF REPETITION OF PLAY IN MUSIC FILE |
| MusicTime=40 | # MUSIC PLAY TIME (SEC) |
| FadeInTime=10 | # TIME PERIOD DURING WHICH FADE-IN EFFECT IS ADDED (SEC) |
| FadeOutTime=5 | # TIME PERIOD DURING WHICH FADE-OUT EFFECT IS ADDED (SEC) |

ELECTRONIC ALBUM PRODUCING AND VIEWING SYSTEM AND METHOD

BACKGROUND OF THE INVENTION

1. Field of the Invention

The present invention relates to an electronic album producing and viewing system comprising an image server and a client computer capable of establishing data communication with each other and a method of producing and viewing an electronic album in the system, an image server included in the system and a method of controlling its operation, a client computer included in the system and a method of controlling its operation, and a recording medium storing a program for controlling the client computer.

2. Description of the Background Art

Electronic album software for producing an electronic album using a personal computer has already been commercially available. Generally used as the electronic album software is one for picking up or imaging a subject using a digital still camera, a movie still video camera, and so forth and filing digital image data obtained by the imaging.

However, it is not considered that the electronic album produced using such electronic album software is utilized or enjoyed on a network which has been developed in recent years.

SUMMARY OF THE INVENTION

The present invention is directed to a system and a method in which an electronic album is utilized or enjoyed on a new network through which a client (computer) and a server (computer) communicate with each other.

Data representing an electronic album which has been produced in a client computer is uploaded to a server (an image server). The image server serves as a stock server of the electronic albums for an user who has the client computer producing and uploading the electronic album. The user does not need to keep the data representing the electronic album in own computer (client), but can download the data from the server when he or she desires to view the album. The other users than the user who uploaded the electronic album data to the server also can access to the server to view the electronic albums which are kept in the server.

An object of the present invention is to make it possible to produce, in a system comprising an image server and a client computer capable of establishing data communication with each other, an electronic album in at least one client computer and view the produced electronic album in the one or the other client computers.

An electronic album system according to the present invention comprises an image server and a plurality of client computers capable of establishing data communication with each other, wherein frame image specific data for specifying a plurality of frame images and display order data representing the order in which the frame images are displayed are transmitted from the client computer to the image server, and an electronic album file including the frame image specific data and the display order data is, in response to a request to transmit the electronic album file from the client computer, transmitted from the image server to the client computer which has issued the request.

The client computer comprises image data transmission requesting means for requesting the image server to transmit frame image data which the client computer does not have therein, the frame image data representing the frame image specified by frame image specific data included in an electronic album file which has been transmitted from the image server.

The image server comprises frame image data transmission means for transmitting, in response to the above request, the requested frame image data to the client computer which has requested to transmit the frame image data.

The present invention also provides a method suitable for the above-mentioned system. That is, the method is a method of controlling the operation of the electronic album system comprising an image server and a plurality of client computers capable of establishing data communication with each other. The method comprises the steps of correlating frame image specific data for specifying a plurality of frame images and display order data representing the order in which the frame images are displayed with each other and transmitting the frame image specific data and the display order data to the image server from the client computer, transmitting an electronic album file including frame image specific data and display order data, in response to a request to transmit electronic album file from said client computer, to the client computer which has issued the request from the image server, issuing, from the client computer which has requested to transmit the electronic album file to the image server, when the client computer does not store frame image data representing a frame image specified by the frame image specific data which is included in the electronic album file transmitted from the image server, a request to transmit the frame image data, transmitting to the client computer from the image server frame image data representing the frame image constituting the electronic album file in response to the request to transmit the frame image data from the client computer.

The present invention also provides a method of controlling the operation of the electronic album producing client computer and a recording medium storing a program therefor, and a method of controlling the operation of the electronic album viewing client computer and a recording medium storing a program therefor.

An electronic album producing client computer according to the present invention can establish data communication with an image server, and comprises frame image selection means for selecting a plurality of frame images constituting an electronic album, display order determination means for determining the order in which the plurality of frame images selected by the frame image selection means are displayed, and electronic album file creating means for correlating frame image specific data for specifying the plurality of frame images selected by the frame image selection means and display order data representing the order determined by the display order determination means with each other to create an electronic album file.

According to the present invention, in the electronic album producing client computer, the plurality of frame images constituting the electronic album are selected, and the order in which the selected plurality of frame images are displayed is determined. An electronic album file in which the frame image specific data for specifying the selected plurality of frame images and the display order data representing the determined order in which the frame images are displayed are correlated with each other is created and transmitted to the image server.

In the image server, the electronic album file is stored.

When the electronic album viewing client computer accesses the image server storing the electronic album file, the electronic album is viewed.

An electronic album viewing client computer according to the present invention can establish data communication with an image server, and comprises electronic album file receiving means for receiving from the image server an electronic album file including frame image specific data for specifying a plurality of frame images constituting an electronic album and display order data representing the order in which the frame images are displayed, image data download means for downloading from the image server, of frame image data representing the plurality of frame images specified by the frame image specific data received by the electronic album file receiving means, the frame image data which is not stored in the client computer, and first electronic album display control means for controlling a display device such that images represented by the stored frame image data and the frame image data downloaded by the image data download means are displayed in accordance with the display order data.

When the electronic album viewing client computer accesses to the image server, the electronic album file is transmitted to the electronic album viewing client computer from the image server, and is received in the electronic album viewing client computer.

Of the frame image data representing the plurality of frame images specified by the frame image specific data described in the received electronic album file, frame image data which is not stored in the client computer is downloaded to the client computer from the image server.

The frame images represented by the frame image data are displayed on the display device in the order represented by the display order data included in the electronic album file. Consequently, the electronic album is viewed. In the client computer capable of establishing data communication with the image server, it is possible to produce the electronic album, and view the produced electronic album.

The client computer may issue a request for viewing an electronic album to the image server. I this case, the image server comprises display list data transmission means for transmitting, in response to the request for viewing the electronic album, data for displaying a list of a plurality of representative images representing outlines of a plurality of electronic albums to the client computer which has issued the request. The client computer comprises designating means for designating a selected representative image out of the list of the representative images which are represented by the list display data transmitted from the image server and representative image specifying data transmission means for transmitting data specifying the representative image designated by the designating means. The image server transmits to the client computer an electronic album corresponding to the representative image specified by the representative image specifying data which has been transmitted from the client computer.

Since the list of the representative images is displayed on the client computer, the user can know outlines of the available electronic albums to select a desired electronic album to be viewed. The electronic album file corresponding to the selected electronic album is transmitted from the image server to the client computer in response to a request from the client computer.

The client computer may further comprise time data transmission means for transmitting at least one of display time data representing a time period during which the frame image is displayed and electronic album display time data representing a time period during which the electronic album is displayed upon correlating with the frame image specific data and the display order data to the image server.

When the electronic album is viewed, the display of the frame images constituting the electronic album can be switched on the basis of the display time data. A display time desired by a user can be set.

Display effect designation data for designating a display effect representing a way of appearance of the frame image or images constituting the frame image may be correlated with the frame image specific data and the display order data and transmitted to the image server.

Consequently, the frame image or the images constituting the frame image can be displayed on the basis of the display effect designation data. Further, the client computer further comprises simulation display control means for controlling a display device such that simulation display based on the display effect designation data is performed. The simulation display thus becomes possible.

The client computer may further comprise sound data transmission means for correlating sound data representing a sound effect of the electronic album with the frame image specific data and the display order data and transmitting the sound data to the image server.

When the electronic album is viewed, a sound can be played on the basis of the sound data.

Furthermore, the sound data may represent a plurality of sound effects, and the client computer may further comprise sound-related data transmission means for correlating at least one of data representing the start and the end of play of each of sounds, data representing the number of times of repetition of a set of sounds, and data representing a time period during which a fade-in effect is added at the time of the start of the play of the sound and a time period during which a fade-out effect is added at the time of the start of the play of the sound with the frame image specific data and the display order data and transmitting the data to the image server.

Each of the data is stored in the electronic album file, thereby making it possible to arbitrarily set the start and the end of output of each of the sounds to be a plurality of types of BGM, the number of times of repetition of a set of the plurality of sounds, the time period during which a fade-in effect is added at the time of the start of the play of the sound, and the time period during which the fade-out effect is added at the time of the end of the play of the sound depending on the taste of the user.

Furthermore, while a preceding frame image is being displayed, the subsequent display frame image data may be downloaded from the image server to the client computer.

In the client computer, the electronic album can be viewed while the image data is being downloaded from the image server. Rapid viewing becomes possible.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 illustrates a frame layout file;

FIG. 8 illustrates a display effect table;

FIG. 11a illustrates an electronic album file, and FIG. 11b illustrates a music information file;

DESCRIPTION OF THE PREFERRED EMBODIMENTS

Figure 1:
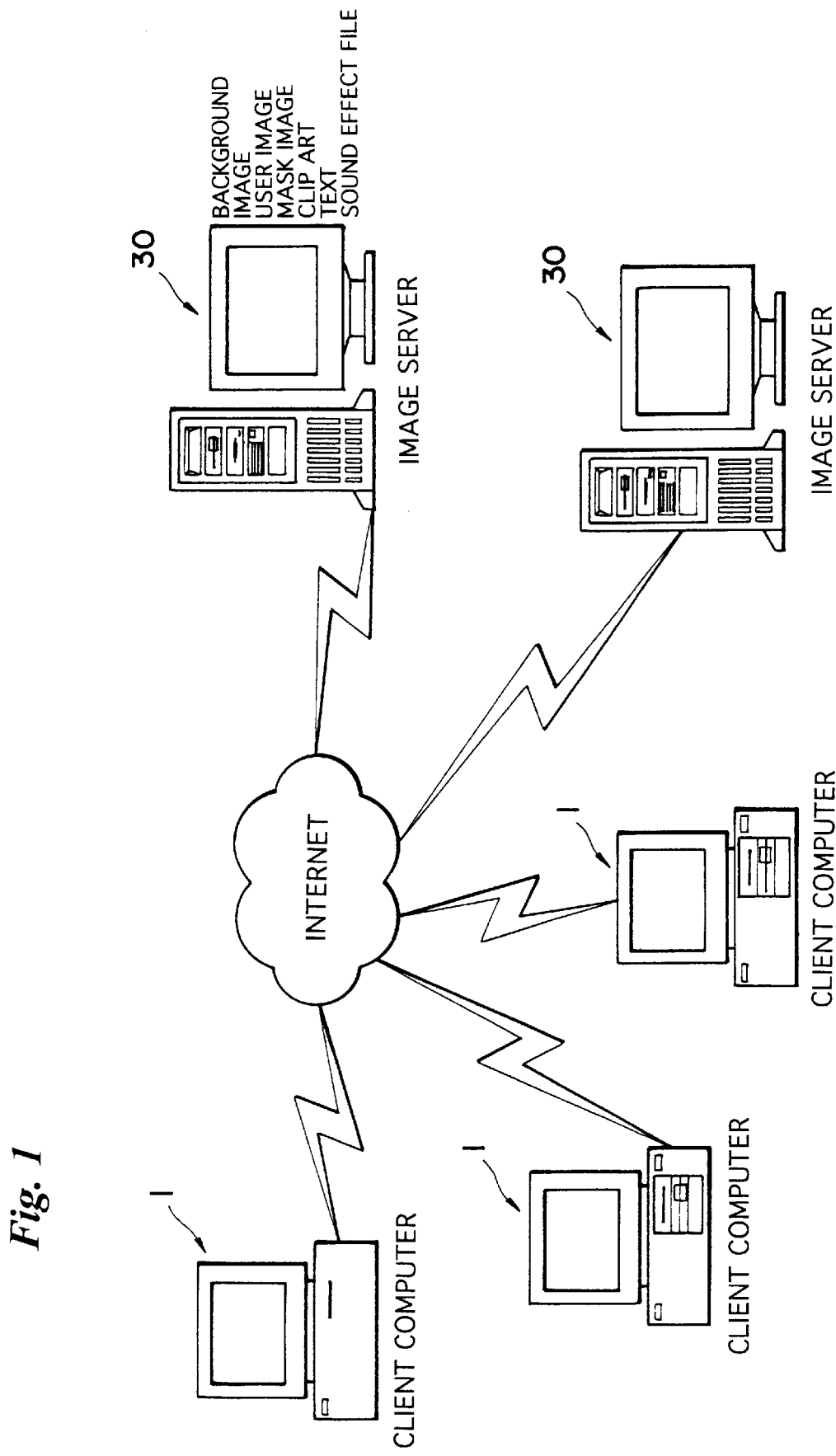
FIG. 1 illustrates an overview of an electronic album producing and viewing system.

FIG. 1 illustrates an overview of an electronic album producing and viewing system.

The electronic album producing and viewing system comprises a client computer 1 and an image server 30. Although three client computers 1 and two image servers 30 are illustrated in FIG. 1, the respective numbers of client computers 1 and image servers 30 may be one or more. The client computer 1 and the image server 30 can establish data communication with each other through the Internet.

The image server 30 stores data respectively representing a background image, a user image, a mask image, a clip art, and a text as well as a sound effect file described later.

An electronic album file is produced in one client computer 1 and the produced electronic album file is uploaded to the image server 30 from the client computer 1. The electronic album can be viewed in the one client computer 1 or the other client computer 1 upon downloading the electronic album file from the image server 30.

Figure 2:
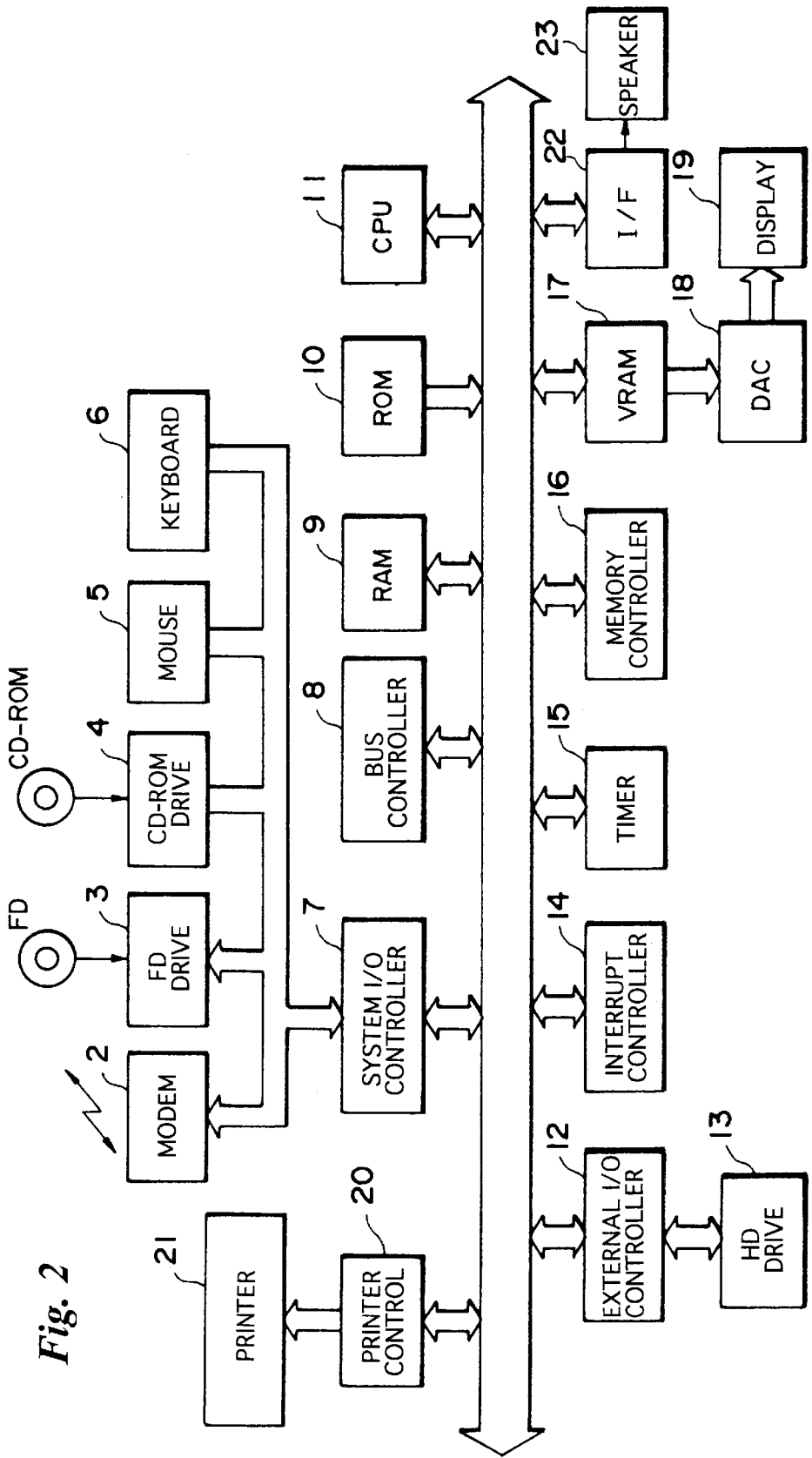
FIG. 2 is a block diagram showing the electrical configuration of a client computer.

FIG. 2 is a block diagram showing the electrical configuration of the client computer 1.

The overall operation of the client computer 1 is supervised by a CPU 11.

A modem 2 for establishing data communication with the image server 30, an FD drive 3 for recording data on an FD (Floppy Disk) and reading the data recorded on the FD, a CD-ROM drive 4 for reading data recorded on a CD-ROM (Compact Disk Read-Only Memory), a mouse 5, and a keyboard 6 are connected to the client computer 1. Data obtained from the modem 2 or the like is fetched into the client computer 1 through a system I/O controller 7.

A program for producing and viewing an electronic album is stored in the CD-ROM, and the program stored in the CD-ROM is read by the CD-ROM drive 4, and is installed in the client computer 1. The program for producing and viewing an electronic album may be downloaded from the image server 30 or another server.

Furthermore, the client computer 1 comprises a bus controller 8, a RAM 9 for temporarily storing data, and a ROM 10 for storing programs and other necessary data. A hard disk drive 13 is connected thereto through an external I/O controller 12. The hard disk drive 13 writes data into a hard disk (not shown) and reads the data recorded on the hard disk.

The client computer 1 comprises an interrupt controller 14, a timer 15, a memory controller 16, and a VRAM (video RAM) 17 for temporarily storing image data for displaying an image on a display device 19. The image data stored in the VRAM 17 is fed to a digital analog converter 18, so that the image data is converted into an analog video signal. The analog video signal is fed to the display device 19, so that an image is displayed on a display screen of the display device 19.

Furthermore, a speaker 23 is connected to the client computer 1 through an interface 22. A sound effect (BGM), described later, is outputted from the speaker 23.

A client printer 21 connected to the client computer 1 is controlled by a printer control circuit 20.

The configuration of the image server 30 is approximately the same as that of the client computer 1. It goes without saying that the resolution of the printer 21 connected to the client computer 1 is relatively low, while the resolution of a printer (not shown) connected to the image server 30 is relatively high, and the performance of each of circuits in the image server 30 is generally higher than the performance of each of the circuits in the client computer 1.

Figure 3:
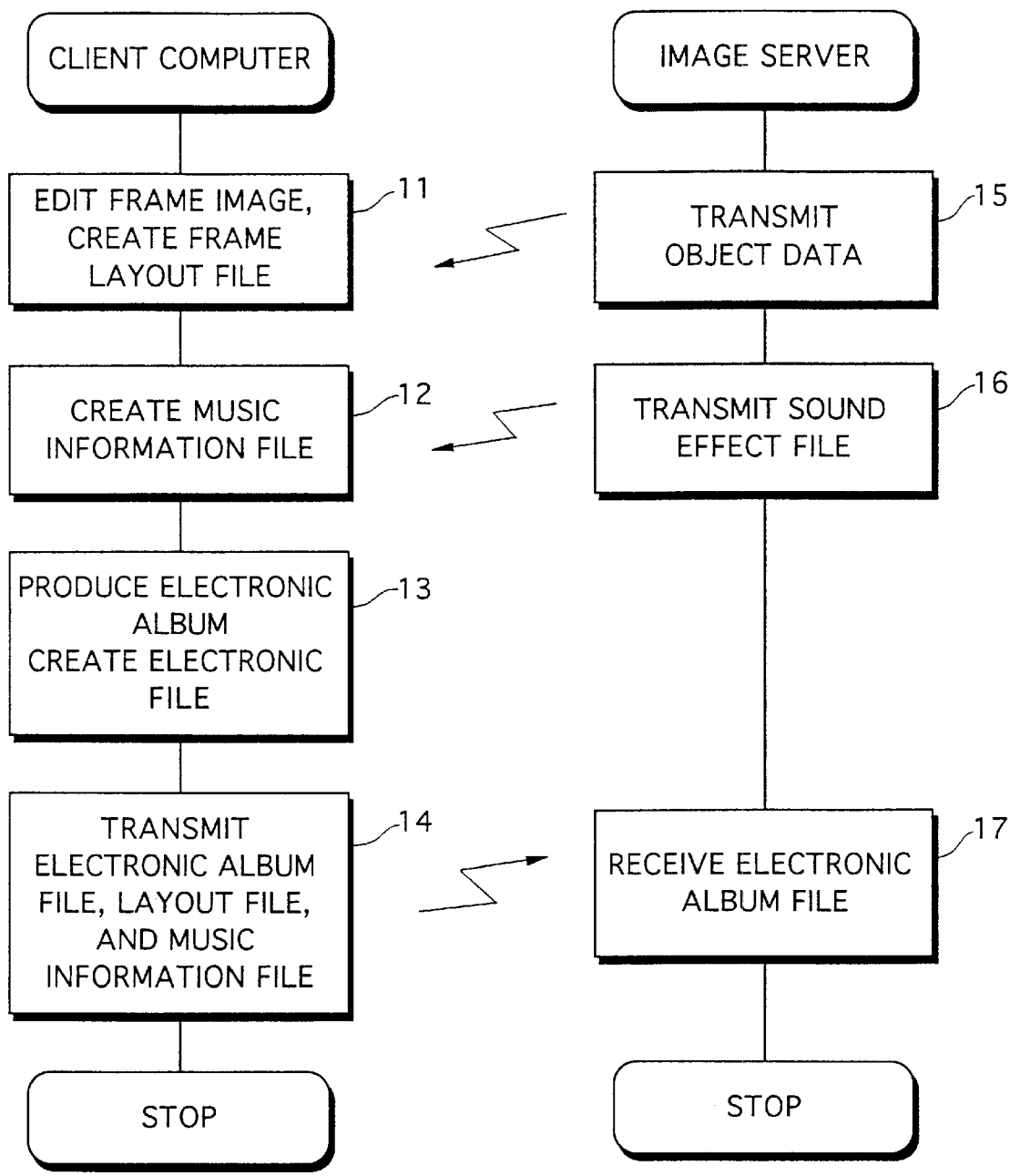
FIG. 3 is a flow chart showing an overview of the production of an electronic album.

FIG. 3 is a flow chart showing an overview of the procedure for producing an electronic album.

The electronic album is constituted by a plurality of frame images (a frame image means a frame of an image, inclusive of a composite image or a synthesized image). It is possible to display, after a frame image is displayed, the subsequent frame image such that pieces of pasteboard constituting a normal or usual paper album are turned over. When the electronic album is produced, the frame image is first edited by a user of the client computer 1. In editing the frame image, object data, representing a background image and the like, which constitutes the frame image, are transmitted from the image server 30 (step 15). When the frame image is edited, a frame layout file representing the frame image is created (step 11).

When the frame layout files are created with respect to all the frame images constituting the electronic album, a sound effect file is transmitted to the client computer 1 from the image server 30 in response to a request from the client computer 1 (step 16). A music information file for representing sound effects of the electronic album is created on the basis of the sound effect file in the client computer 1 (step 12).

Thereafter, the electronic album is produced. When the electronic album is produced, an electronic album file relating to the electronic album is created (step 13).

The created electronic album file, frame layout file, and music information file are transmitted from the client computer 1 to the image server 30 (step 14). The electronic album file and other files are received in the image server 30, and are stored therein (step 17).

The details of processing performed until the electronic album is produced will become clear by the following description.

Figure 4:
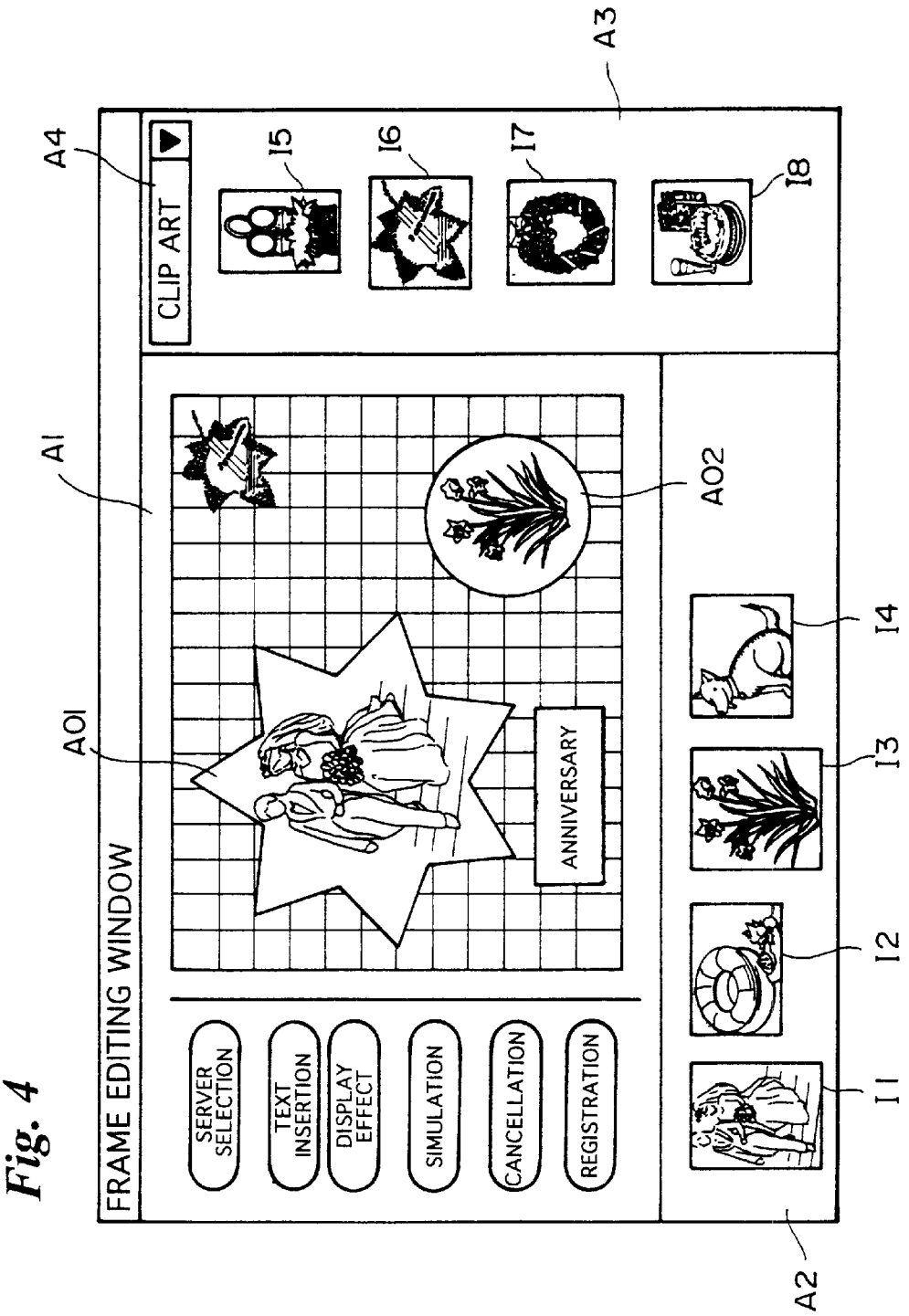
FIG. 4 illustrates an example of a window displayed on a display device of a client computer.
Figure 5:
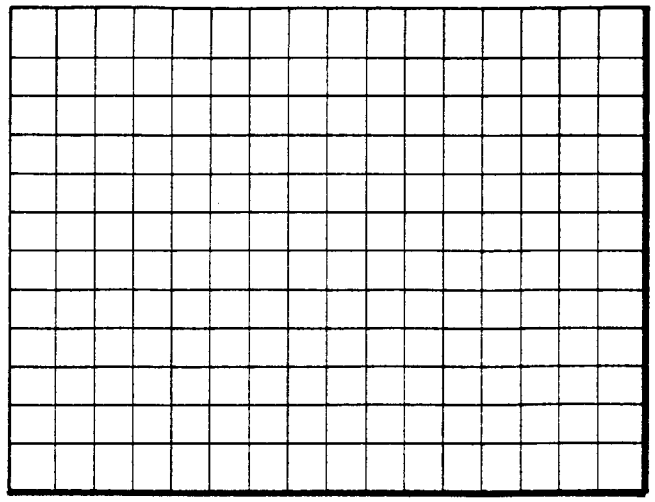
FIG. 5 illustrates an example of a background image.
Figure 6:
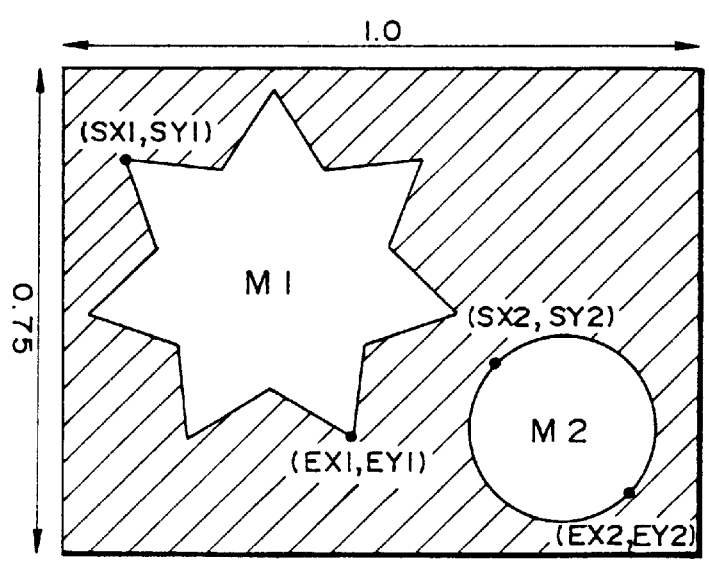
FIG. 6 illustrates an example of a mask image.

FIG. 4 illustrates an example of a window appearing on the display screen of the display device 19 connected to the client computer 1. FIG. 5 illustrates an example of a background image used when a frame image is created, and FIG.

6 illustrates an example of a mask image used when the frame image is created. FIG. 7 illustrates a created frame layout file, and FIG. 8 illustrates a display effect table.

Figure 9:
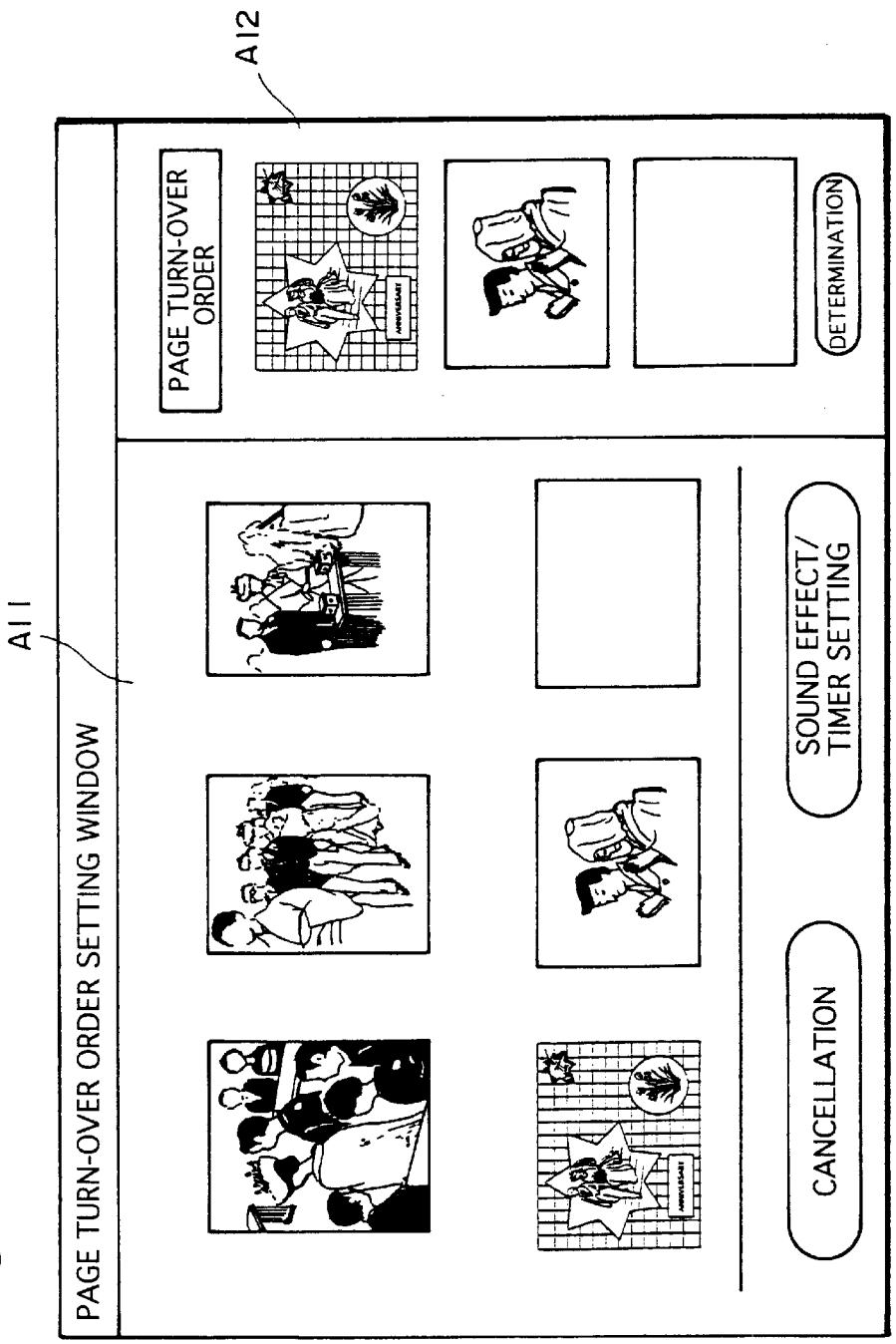
FIGS. 9 and 10 illustrate examples of a window displayed on a display device of a client computer.
Figure 10:
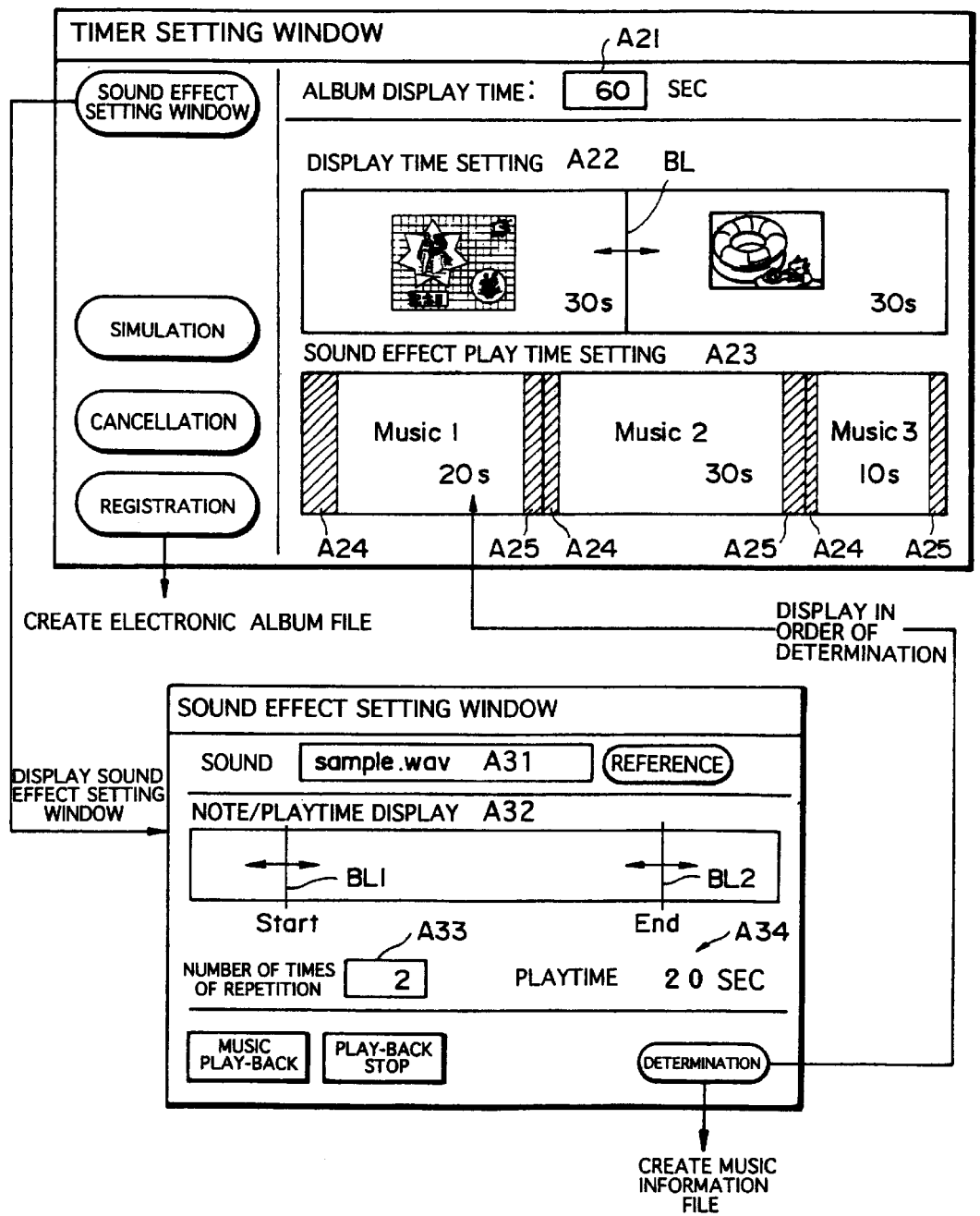

FIGS. 9 and 10 illustrate examples of windows appearing on the display screen of the display device 19 connected to the client computer 1. FIG. 11a illustrates a created electronic album file, and FIG. 11b illustrates a created music information file.

Figure 12:
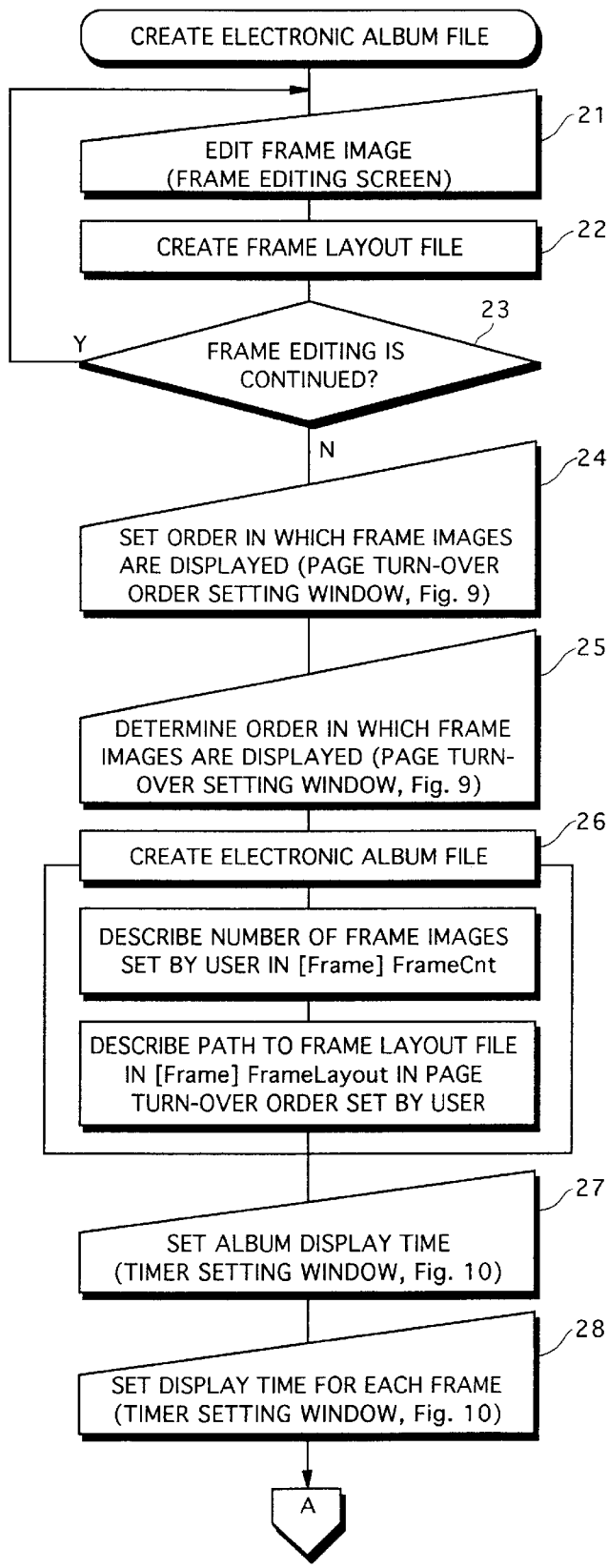
FIGS. 12 to 14 are flow charts showing the details of the procedure for creating an electronic album file.
Figure 13:
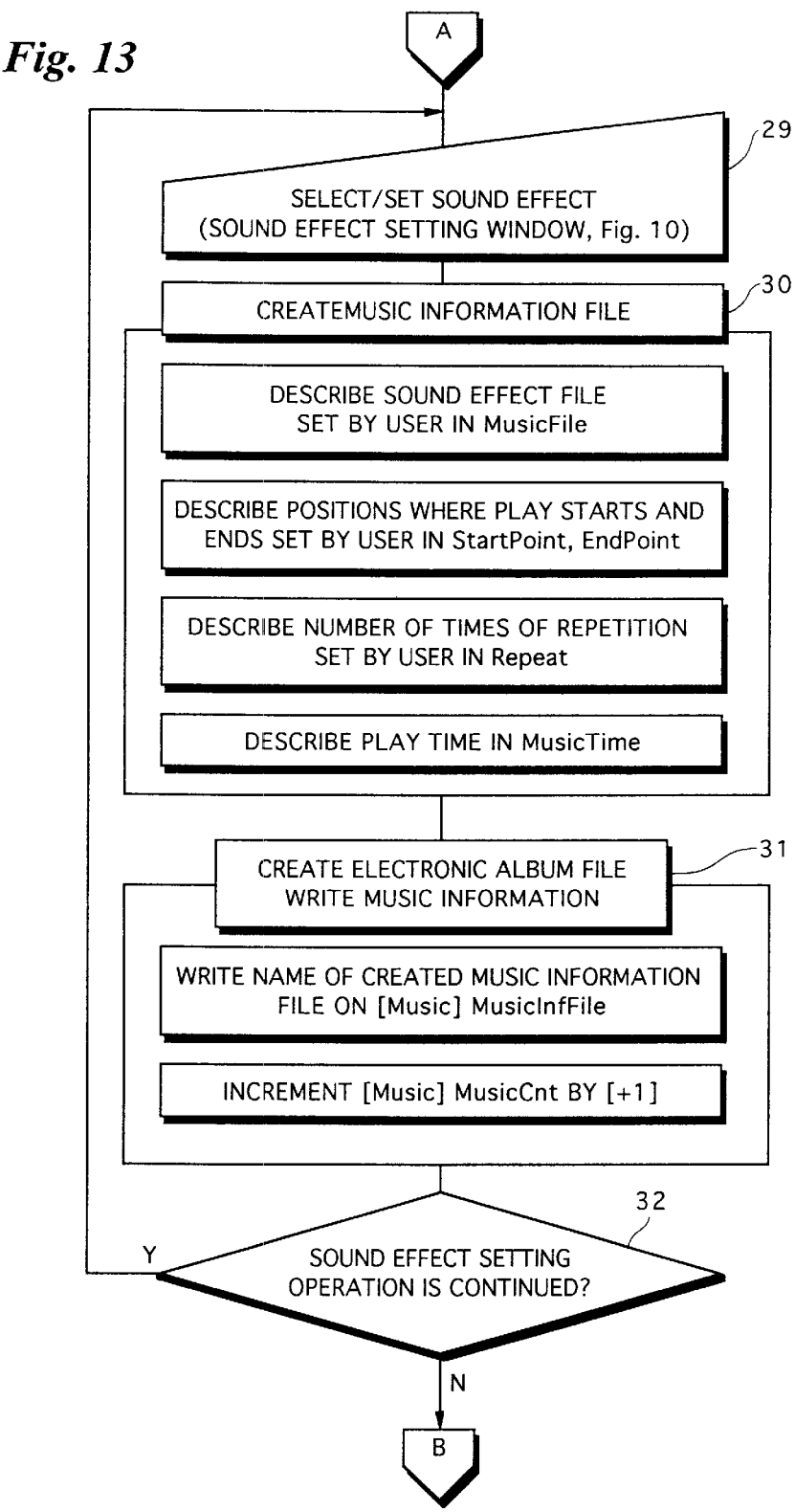
Figure 14:
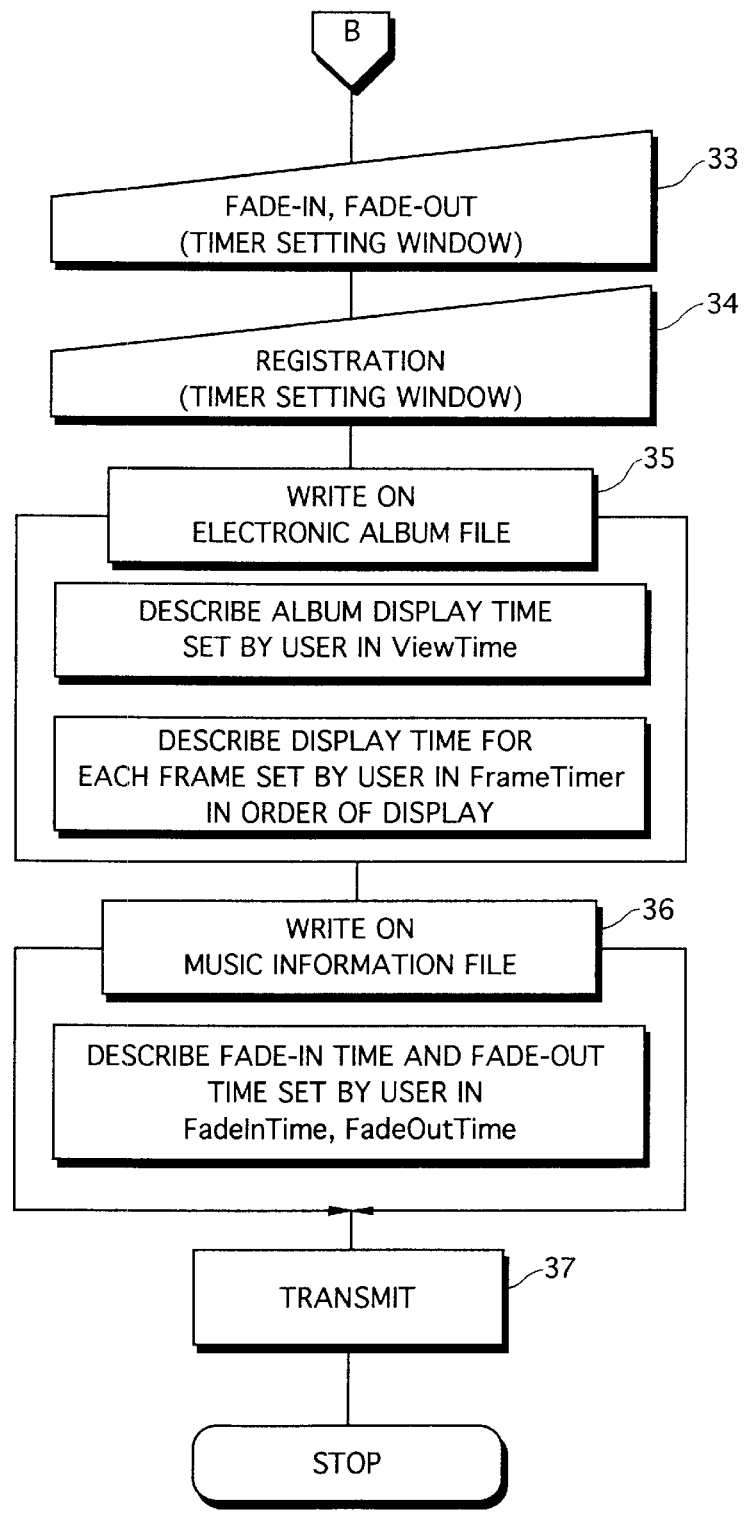

FIGS. 12 to 14 are flow charts showing the procedure for processing performed until an electronic album is produced.

Referring now to FIGS. 4 to 8 and FIGS. 12 to 14, description is made of processing for editing a frame image (processing at the step 11 shown in FIG. 3).

In editing a frame image, a background image to be a background of the frame image and a mask image in which a composite area for defining the position where a user image which is synthesized on the background image to constitute the frame image is synthesized and the size of the user image is formed are selected by the user of the client computer 1. Here, the background image shown in FIG. 5 and the mask image shown in FIG. 6 shall be selected. Image data representing a plurality of background images and image data representing a plurality of mask images are downloaded from the image server 30, so that a desired background image and a desired mask image are selected.

Two composite areas M1 and M2 are formed in the mask image. The first composite area M1 is in the shape of a star. The position of the first composite area M1 is defined by positions (SX1, SY1) and (EX1, EY2) of two of the vertices of the star. The second composite area M2 is in the shape of a circle. The second composite area M2 is defined by positions (SX2, SY2) and (EX2, EY2) of two points on the circumference. The positions of the areas may be, of course, respectively defined by the coordinates of a point at the center of the star and the coordinates of a point at the center of the circle.

In FIG. 4, a frame editing window includes the following areas:

Server selection area;

A list of image servers which the client computer 1 can access is displayed by clicking the server selection area. Image data and the like which are stored in the desired image server 30 can be utilized.

Text insertion area;

A text insertion window (not shown) for editing a text to be inserted into the frame image is displayed on the display device 19 of the client computer 1 by clicking the text insertion area. In the text editing window, the contents, the font, the character size, the color, the insertion position, and so forth of a text to be inserted into the frame image are set.

Display effect area;

A window (not shown) for setting display effects (display methods) of a background image, a user image, a clip art and a text (each is referred to as an object) which constitute the frame image is displayed by clicking the display effect area. In a display effect setting window, the display effect in each of the objects and the order in which the objects are displayed are set. The display effect is selected from the display effect table shown in FIG. 8. The same display effect table is stored in both the client computer 1 and the image server 30. Consequently, the display effect can be designated by designating an ID.

Simulation area;

A frame image which is being edited is displayed in accordance with the set display effect by clicking the simulation area.

Cancellation area;

Various types of editing information set on the frame editing window are canceled by clicking the cancellation area.

Registration area;

Various types of editing information set on the frame editing window are registered, thereby creating a frame layout file, by clicking the registration area.

Frame image editing area A1;

A frame image which is being edited is displayed thereon.

User image display area A2;

User images represented by the image data stored in the image server 30 are displayed thereon.

Background image/mask image/clip art display area A3;

Background images, mask images, or clip art images which are represented by the image data stored in the image server 30 are displayed thereon. The display area A3 includes a selection area A4. By pulling down the selection area A4, images to be displayed in the display area A3 are selected out of the background images, the mask images, and the clip art images.

The selection area A4 is pull downed by the user, and the background image in the area A4 is clicked, so that a list of background images is displayed in the area A3. A background image desired by the user is selected out of the background images whose list is displayed. The selected background image is displayed in the area A1.

When the background image has been selected, then a mask image is selected. The selection area A4 is pull downed by the user, and the mask image in the area A4 is clicked, so that a list of mask images is displayed in the area A3. A mask image desired by the user is selected out of the mask images whose list is displayed. When the mask image is selected, areas, which correspond to the composite areas M1 and M2, defined by the selected mask image are clipped from the background image displayed in the area A1. The background image from which the areas corresponding to the composite areas M1 and M2 are clipped is displayed in the area A1.

A desired user image is then selected out of the user images displayed in the area A2. When the user image is selected, an area on which the selected user image is to be synthesized is selected. When the area on which the user image is to be synthesized is selected, the selected user image is synthesized on the area. In this example, a first user image I1 is synthesized on an area A01, and a second user image I3 is synthesized on an area A02.

The selection area A4 is then pull downed, and the clip art in the area A4 is clicked, so that a list of clip arts is displayed in the area A3. A clip art desired by the user is selected out of the clip arts whose list is displayed. The selected clip art I6 is synthesized at a position designated by the user.

Furthermore, the text insertion area is clicked by the user, so that the text insertion window is displayed. In the text insertion window, a desired text, its font and so forth are entered from the keyboard 6. The entered text is synthesized on the frame editing image at a position designated by the user.

The editing of one of the plurality of frame images constituting the electronic album is terminated by the above-mentioned frame image editing processing (step 21). Here, a first user image I1 is synthesized on the area A01, and a second user image I3 is synthesized on the area A02. A clip art I6 is synthesized on the upper right of the frame image, and a text "anniversary" is synthesized on the lower left of the frame image.

Referring mainly to FIG. 7, the frame layout file stores a file name, a path to a background image, the number of user images to be synthesized on a frame image, a path to the user image to be synthesized on the frame image, a path to a mask image used for creating the frame image, the number of clip arts to be synthesized on the frame image, a path to the clip art to be synthesized on the frame image, the number of texts to be synthesized on the frame image, and a path to the text to be synthesized on the frame image.

The frame layout file further stores data respectively representing the number of objects to be synthesized on the frame image, an ID assigned to the object to be synthesized on the frame image (here, the background image is specified by "00", the first user image is specified by "10", the second user image is specified by "11", the clip art is specified by "20", and the text is specified by "30"), the display effect of the object (designated by an ID assigned to a display effect), the order in which the objects are displayed (corresponding to the order of object IDs), the position where the object is displayed, and the aspect ratio (the width/length) of the frame image.

When the frame image editing processing is terminated, the registration area is clicked by the user, so that the frame layout file storing the above-mentioned data is created (step 22). The created frame layout file is stored in a hard disk of the client computer 1.

In FIG. 7, the number of user images to be synthesized on the frame image is two, so that UsrImgCnt is 2, and the number of clip arts to be synthesized on the frame image is one, so that CripArtCnt is 1. Further, the number of texts to be synthesized on the frame image is one, so that TextCnt is 1, and the total number of objects constituting the frame image is 5, so that ObjectCnt is 5.

Furthermore, the display effect of the background image is set to slide in (from the right), the display effects of the first user image I1 and the second user image I3 are set to slide in (from the top), the display effect of the clip art is set to slide in (from the bottom), and the display effect of the text is set to slide in (from the right) (see ViewType and FIG. 8).

The frame image is set such that the background image is first displayed, the second user image is then displayed, the first user image is then displayed, the text is then displayed, and the clip art is finally displayed (see ViewOrder).

The above-mentioned frame image editing processing is repeated with respect to all the frame images constituting the electronic album (step 23).

Referring now to FIGS. 9 to 14, description is made of processing performed until the electronic album is produced using the created frame images (processing at the steps 12 and 13 shown in FIG. 3).

When the editing processing is terminated with respect to all the frame images constituting the electronic album (NO at step 23), the program proceeds to electronic album file creation processing.

In the electronic album file creation processing, a page turn-over order setting window shown in FIG. 9 is displayed on the display screen of the display device 19 of the client computer 1 (step 24).

The page turn-over order setting window includes the following areas:

Frame image display area A11;
The frame images edited in the above-mentioned manner and constituting the electronic album are displayed in the frame image display area.

Page turn-over order display area A12;
The frame images are displayed in the page turn-over order display area in descending order in correspondence with the order of display of the frame images constituting the electronic album.

Cancellation area;
The set order in which the frame images are displayed is canceled by clicking the cancellation area.

Sound effect/timer setting area;
A sound effect setting window and a timer setting window, described later, are displayed by clicking the sound effect/timer setting area.

Determination area;
The set order in which the frame images are displayed is determined by clicking the determination area.

The user of the client computer 1 sees the frame images displayed in the area A11, to select the frame images in the order of pages which the user desires. The selected frame images are displayed in the page turn-over order area A12 in the order selected. The determination area is clicked by the user, to determine the set order in which the frame images are displayed (step 25).

When the order in which the frame images are displayed is determined, an electronic album file is created (step 26). Referring mainly to FIG. 11a, the electronic album file stores data respectively representing a file name, a time period during which the electronic album is displayed (hereinafter referred to as album display time), the number of frame images constituting the electronic album, a path to a frame layout file relating to the frame image, a time period during which each of the frame images is displayed (hereinafter referred to as display time for each frame image), the number of sound effect files, and a path to a music information file, described later. The number of frame images is stored in FrameCnt, and the path to the frame layout file relating to the frame image is stored in FrameLayout in accordance with the order in which the frame images are displayed.

When the sound effect/timer setting area is then clicked by the user, a timer setting window shown in FIG. 10 appears on the display device 19 of the client computer 1 (step 27). Each of the times is set, as described below, on the timer setting window (step 28).

Referring mainly to FIG. 10, the timer setting window includes the following areas:

Album display time display area A21;
The album display time is displayed in the album display time display area.

Display time setting area A22;
The display time for each of the frame images constituting the electronic album is displayed in the display time setting area. A reduced image of each of the frame images and the display time for the frame image are displayed in the area. There is a boundary line BL between the reduced images of the adjacent frame images. The boundary line BL is slid rightward and leftward using the mouse 5. The display time for the frame image is set depending on the position of the boundary line BL.

Sound effect play time setting area A23;
A file name of a sound effect and a time period during which the sound effect is outputted, which are set on a sound effect setting window, described later, are displayed in the sound effect play time setting area. When the file name of the sound effect is clicked by the user, a corresponding sound effect setting window for the sound effect file is displayed. The correction of the sound effect becomes possible. A time period during which a fade-in effect is added (hereinafter referred to as fade-in time) is set by sliding a fade-in setting bar A24 using the mouse 5, while a time period during which a fade-out effect is added (hereinafter referred to as fade-out time) is set by sliding a fade-out setting bar A25 using the mouse 5.

Sound effect setting area;

A sound effect setting window is displayed by clicking the sound effect setting area.

Simulation area;

The set sound effect is played upon being simulated by clicking the simulation area.

Cancellation area;

The set sound effect is canceled by clicking the cancellation area.

Registration area;

Data relating to the set sound effect is registered in the electronic album file.

The sound effect setting window includes the following areas:

Reference area;

The reference area is clicked by the user, to display a sound effect file selection dialog.

Selected sound effect file display area A31;

A sound effect file selected out of sound effect files displayed on the sound effect file selection dialog is displayed in the selected sound effect file display area.

Note/play time display area A32;

Notes of selected music and a time period during which the music is played (hereinafter referred to as play time) are displayed in the note/play time display area. The time when the play starts is set by sliding a first boundary line BL1 in the area using the mouse, while the time when the play ends is set by sliding a second boundary line BL2 using the mouse.

Repetition number display area A33;

The number of times of repetition of the music used as a sound effect of the electronic album is displayed in the repetition number display area.

Play time display area A34;

The play time as the sound effect is displayed in the play time display area.

Music play-back area;

The set sound effect is played back.

Music play-back stop area;

The sound effect which is being played back is stopped.

Determination area;

When the setting of the sound effect is terminated, the determination area is clicked. The determination area is clicked, to display the times and the file name which are set in the sound effect play time setting area A23 on the timer setting window. Further, a music information file is created.

The music information file stores data respectively representing a file name, a path to the sound effect file, the position where (the time when) play starts in the music file, the position where (the time when) play ends in the music file, the number of times of repetition, the music play time, the fade-in time, and the fade-out time. The determination area is clicked by the user, to store various types of data relating to the set sound effect in the music information file (steps 29 and 30).

When the music information file is created, a path to the created music information file is stored in the electronic album file (step 31). When the path to the music information file is stored in the electronic album file, the number of sound effect files in the electronic album file is incremented.

The setting is repeated with respect to all sound effects (step 32). In the setting of the sound effect, it goes without saying that the sound effect file is downloaded from the image server 30 as required.

On the timer setting window, the fade-in time and the fade-out time are then set with respect to each of the sound effect files (step 33).

When the registration area is clicked by the user (step 34), data representing the album display time set at step 27 and the display time for each frame set at step 28 are stored in the electronic album file (step 35). That is, the album display time is stored in ViewTime, and the display time for each of the frame images is stored in FrameTimer, which times are respectively set by the user.

Furthermore, the fade-in time and the fade-out time which are set by the user are stored FadeInTime and FadeOutTime in the music information file (step 36).

The electronic album file is thus created by the user of the client computer 1. The created electronic album file, frame layout file, and music information file are transmitted to the image server 30 from the client computer 1, as described above (step 37).

Figure 15:
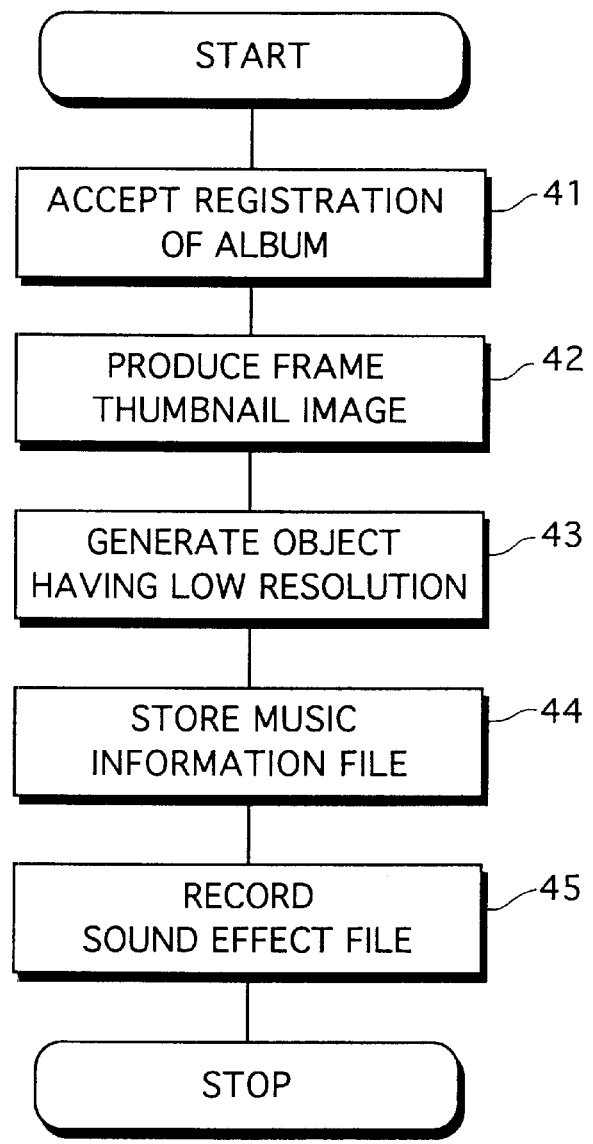
FIG. 15 shows the procedure for processing in an image server.
Figure 16:
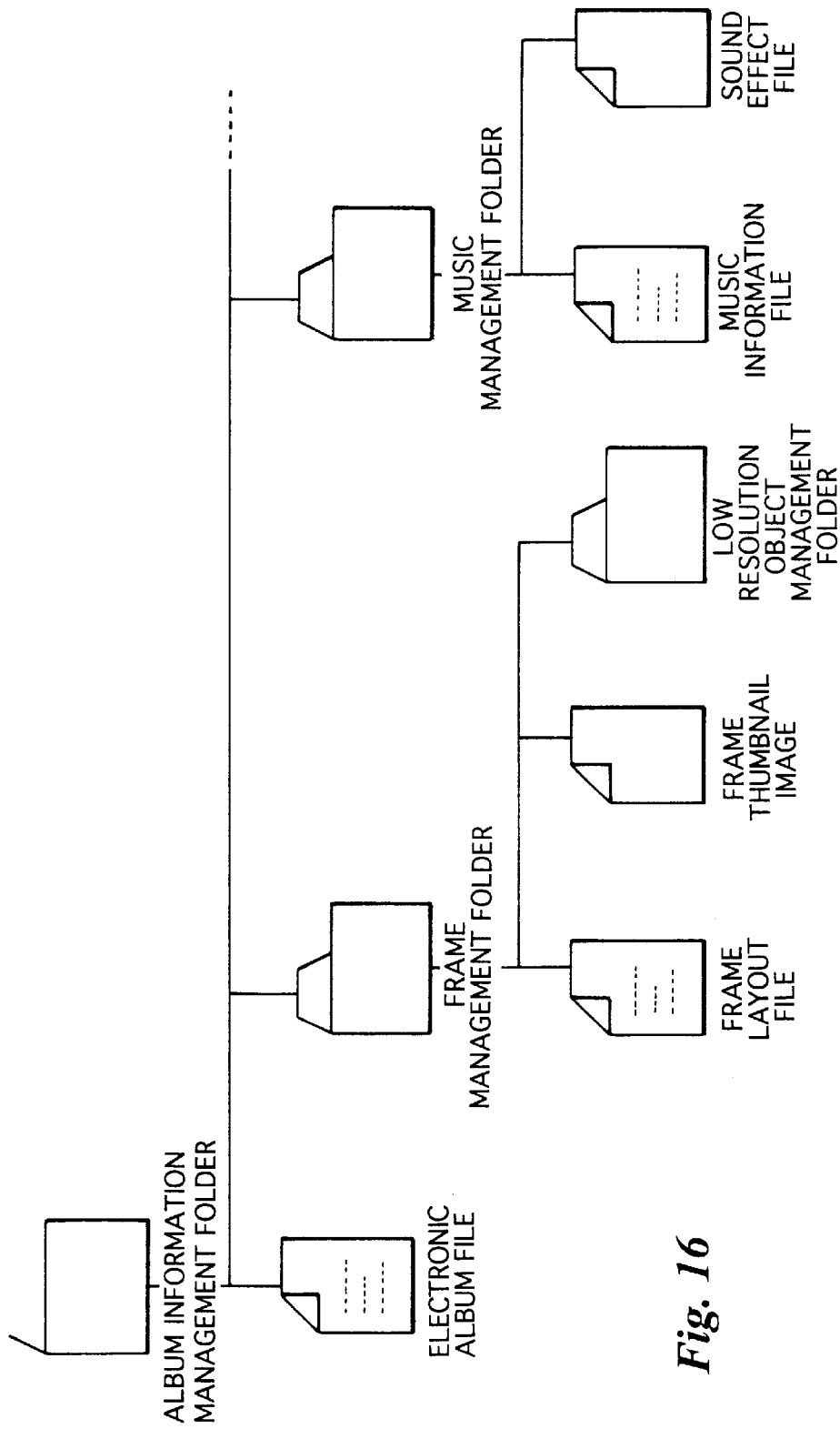
FIG. 16 illustrates various folders generated in an image server.

FIG. 15 is a flow chart showing the procedure for processing in the image server 30. FIG. 16 illustrates folders and files which are managed by the image server 30.

An album information management folder includes the electronic album file, a frame management folder, and a music management folder. The frame management folder stores the frame layout file. Further, the frame management folder stores a frame thumbnail image file and a low resolution object management folder, described later. The folders and the files are recorded on a hard disk (or other storage devices) of the image server 30.

When the electronic album file, the frame layout file, and the music information file are transmitted from the client computer 1, it is considered that the electronic album is registered (step 41), so that the transmitted electronic album file is stored in the album information management folder in the image server 30. If the album information management folder is not prepared in the image server 30, the album information management folder is generated when the electronic album file is first transmitted from the client computer 1. Further, the frame layout file is stored in the frame management folder while referring to the path to the frame layout file stored in the electronic album file.

Thumbnail images are created with respect to all the frame images constituting the electronic album on the basis of the frame layout file stored in the frame management folder (step 42).

Image data representing each of the objects constituting the frame image is read out from the hard disk of the image server 30 while referring to the path to the object stored in the frame layout file. When the image data representing each of the objects is stored in the other image server, it is downloaded from the other image server. In either case, when the image data representing each of the objects is obtained, image data representing an object having a low resolution is generated from the obtained image data (step 43). The generated image data representing each of the objects having a low resolution is stored in the low resolution object management folder.

Furthermore, the transmitted music information file is stored in the music management folder (step 44). The sound effect file is read from the hard disk of the image server 30 while referring to the path stored in the music information file. The read sound effect file is stored in the music management folder (step 45). It goes without saying that the sound effect file is, if required, downloaded by accessing the other image server.

A method of viewing the electronic album will be described.

Figure 17:
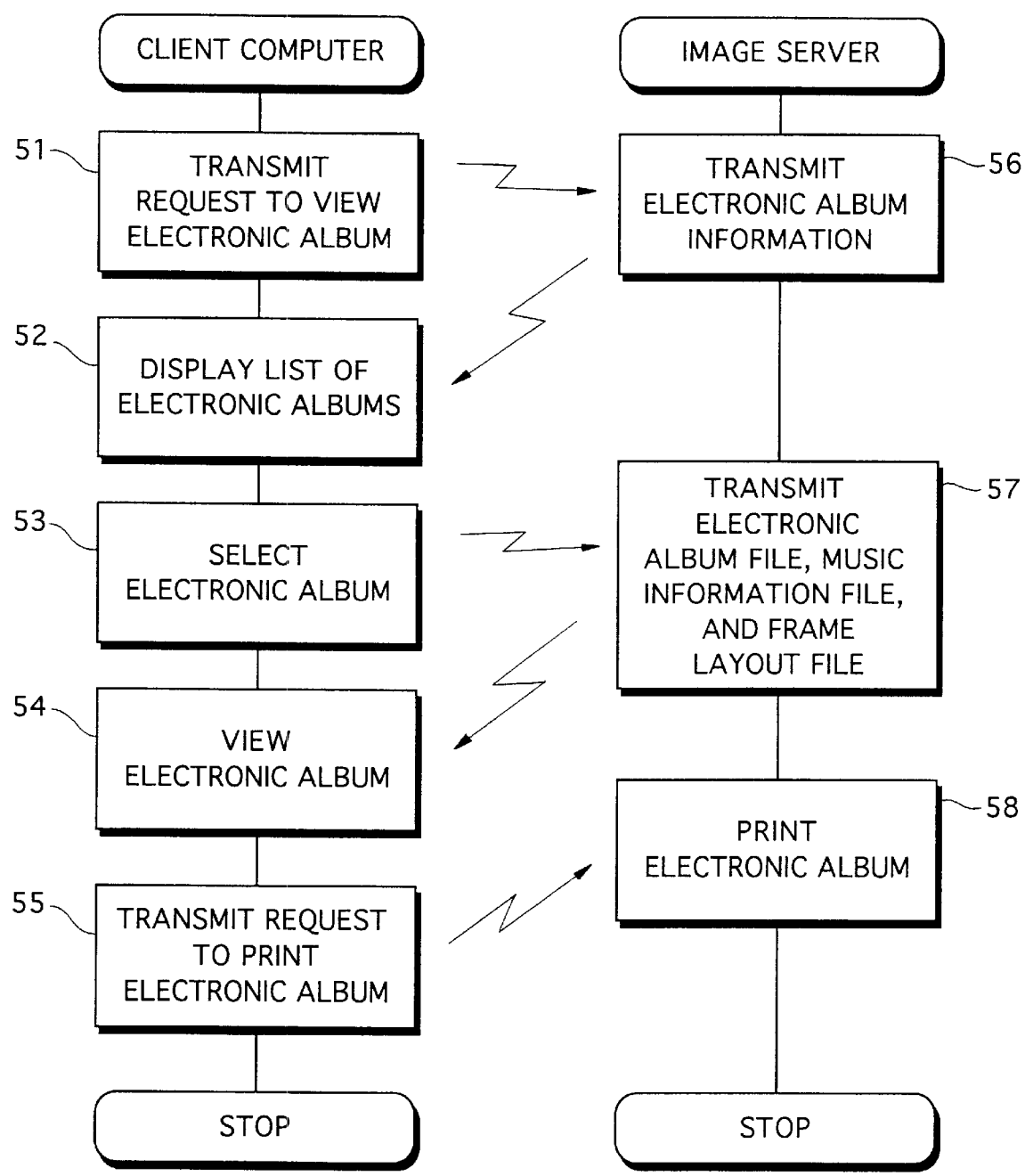
FIG. 17 is a flow chart showing an overview of the procedure for viewing an electronic album.

FIG. 17 is a flow chart showing an overview of the procedure for viewing the electronic album.

When the client computer 1 and the image server 30 are connected to each other, a request to view the electronic album is transmitted to the image server 30 from the client computer 1 (step 51).

When the request to view the electronic album from the client computer 1 is received in the image server 30, image data representing thumbnail images of the frame images on the first pages (cover pages) of the electronic albums stored in the album information management folder in the image server 30 which has received the viewing request is transmitted, as electronic album information, to the client computer 1 which has issued the viewing request (step 56).

When the electronic album information is received by the client computer 1, a list of electronic albums (that is, thumbnail images on the cover pages) is displayed on the client computer 1 (step 52). A desired electronic album (a desired thumbnail image of the cover page) is selected out of the displayed thumbnail images by the user of the client computer 1 (selection of electronic album) (step 53).

Data representing the selected electronic album (the name of the electronic album file) is transmitted to the image server 30 from the client computer 1. An electronic album file, a frame layout file, and a music information file relating to the selected electronic album are transmitted to the client computer 1 from the image server 30 (step 57).

When the electronic album file, the frame layout file, and the music information file are received in the client computer 1, frame images constituting the electronic album are displayed on the display device 19 of the client computer 1, so that the electronic album is viewed (step 54). The user of the client computer 1 who has viewed the electronic album transmits, when he or she desires to print the electronic album (or one or a plurality of frame images included in the electronic album), a request to print the electronic album to the image server 30 (step 55).

The image server 30 which has received the album printing request prints the electronic album (a frame image or frame images) using a high resolution printer in response to the request (step 58). A print obtained by the printing is mailed to the user of the client computer 1 by an operator of the image server 30, for example.

The details of the electronic album viewing processing will become clear by the following description.

Description is first made of processing for downloading to the client computer 1 all data (the electronic album file, frame layout file, music information file, object image data and sound effect file) required to view the electronic album and then, viewing the electronic album in the display device 19 of the client computer 1.

Figure 18:
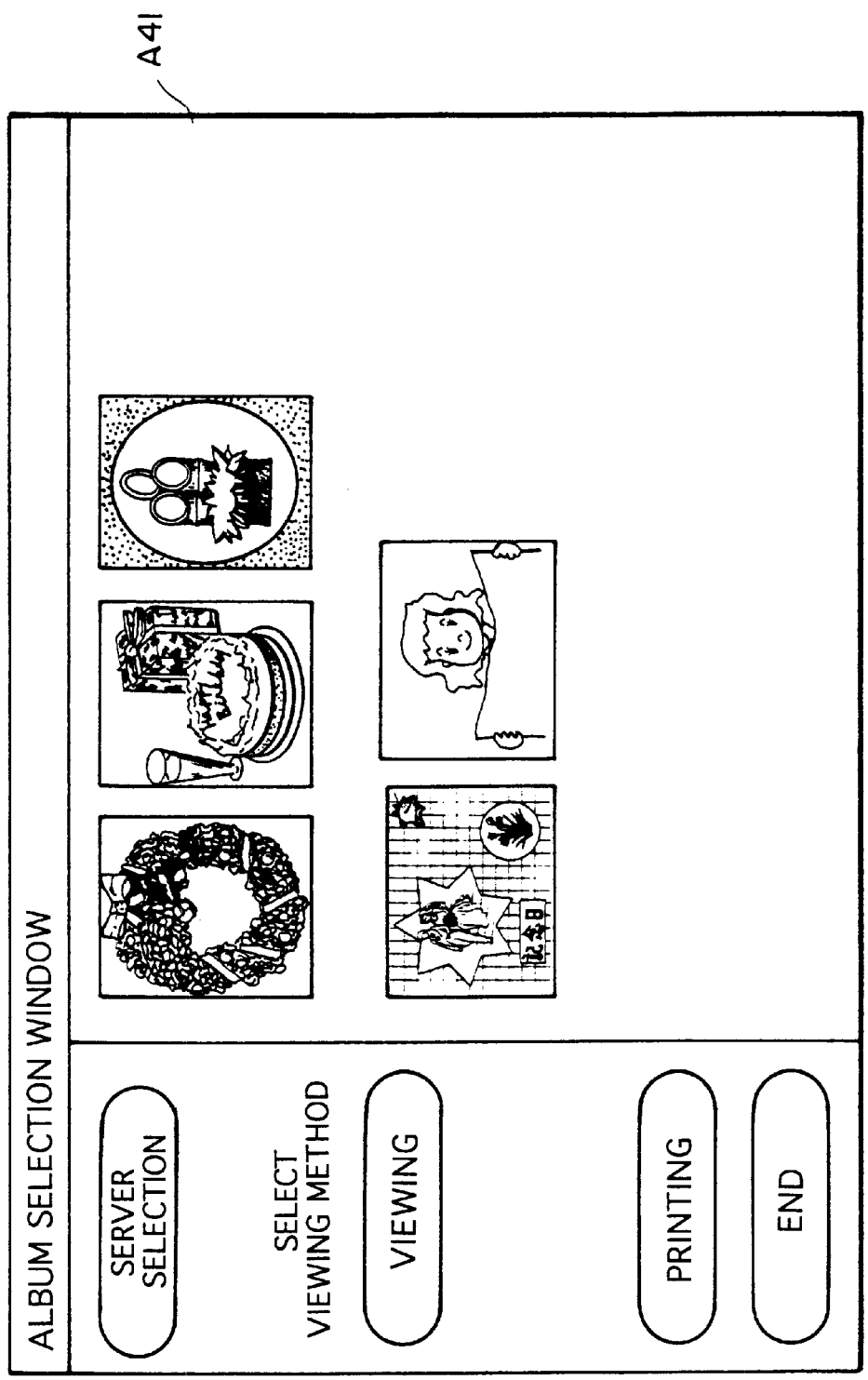
FIGS. 18 and 19 illustrate examples of a window displayed on a display device of a client computer.
Figure 19:
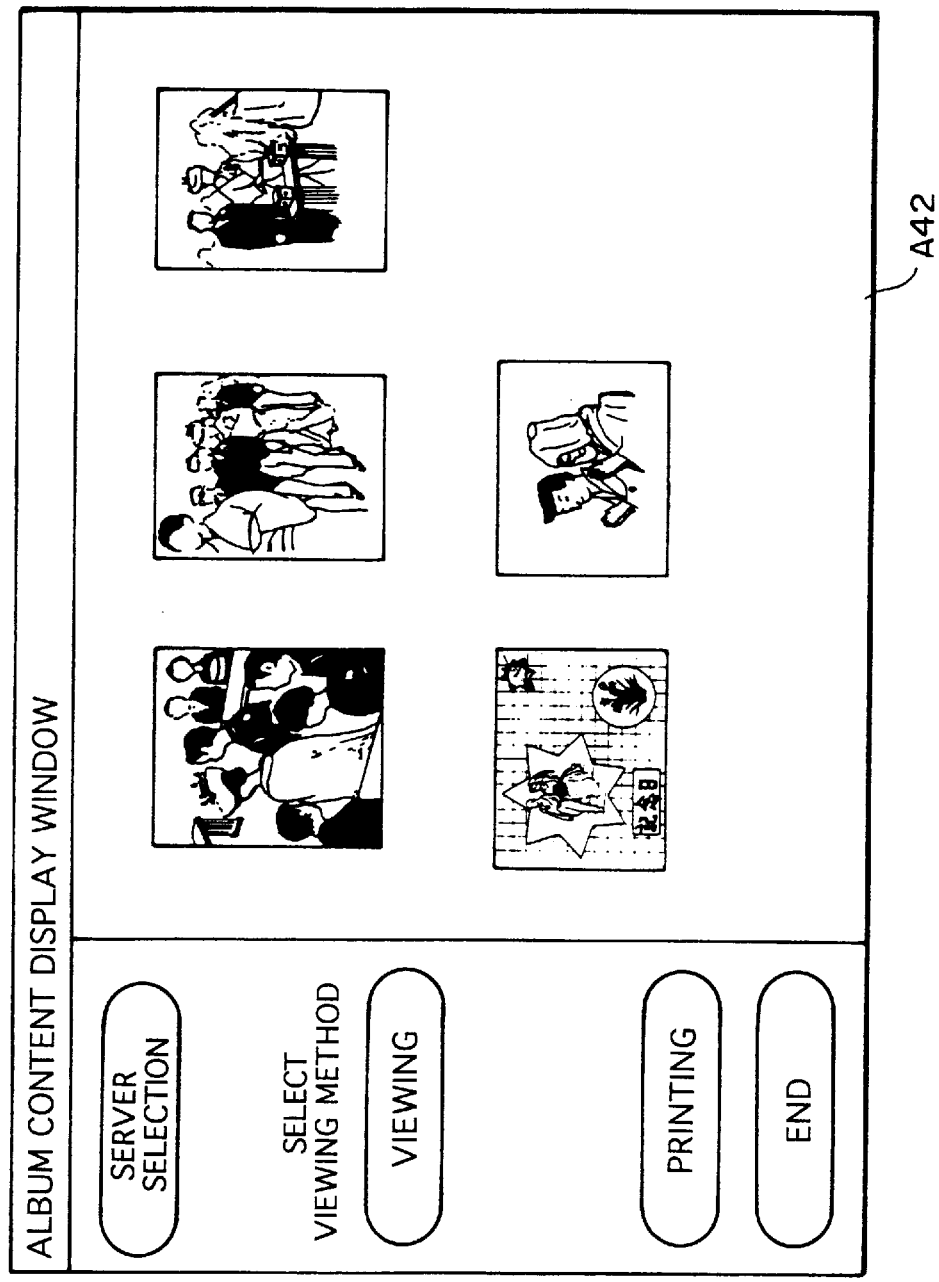
Figure 20:
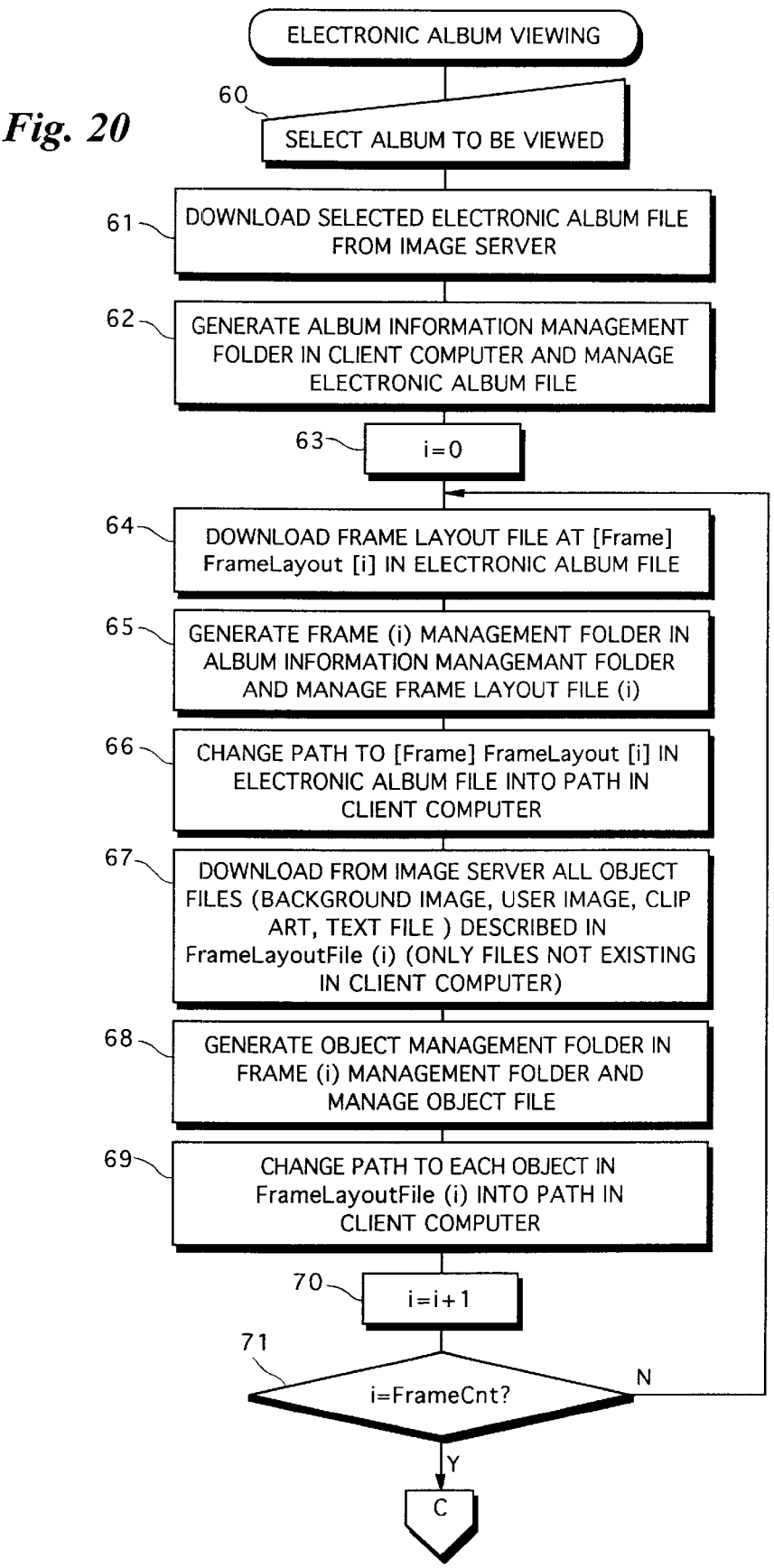
FIGS. 20 to 22 are flow charts showing the detailed procedure for viewing an electronic album.
Figure 21:
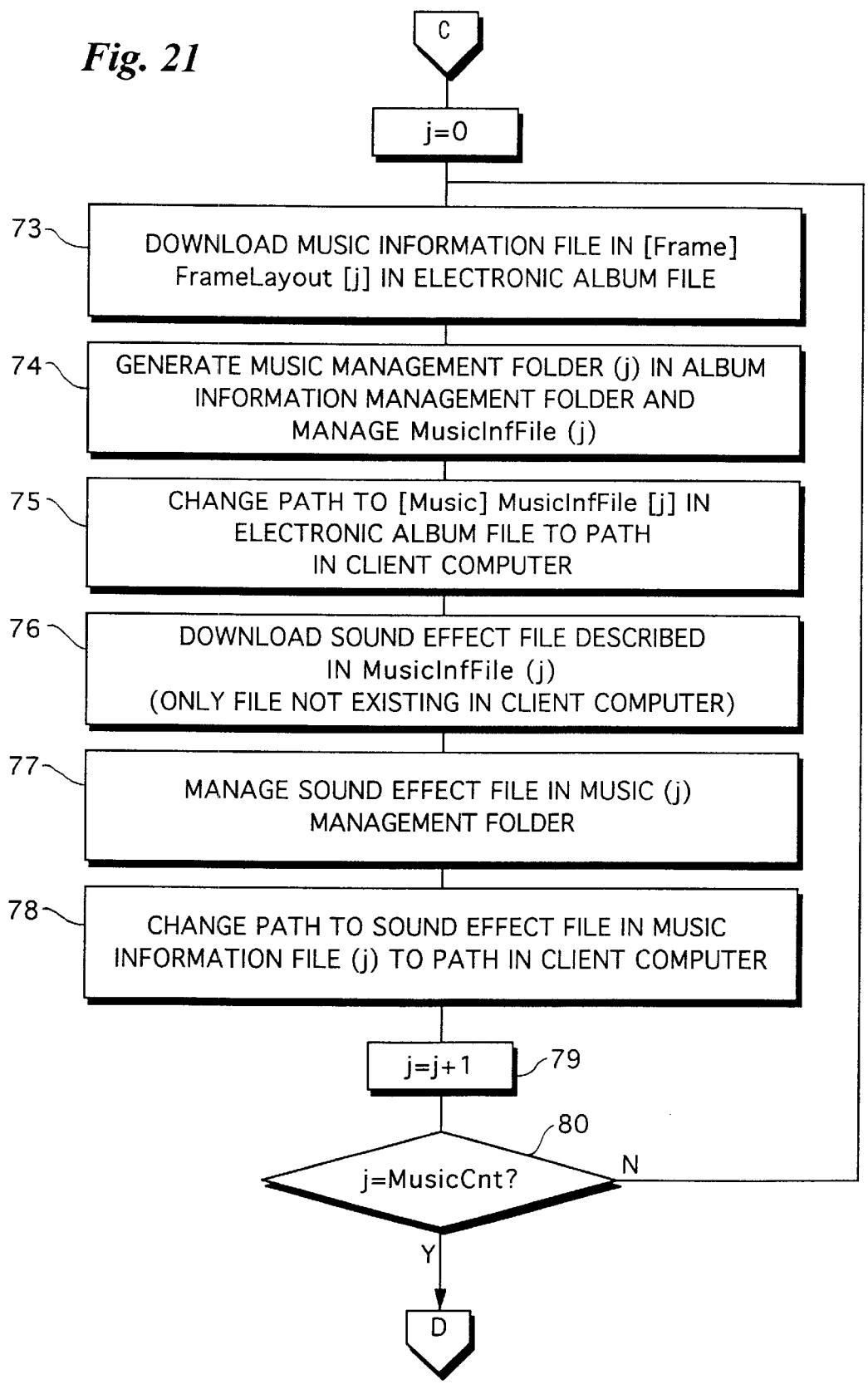
Figure 22:
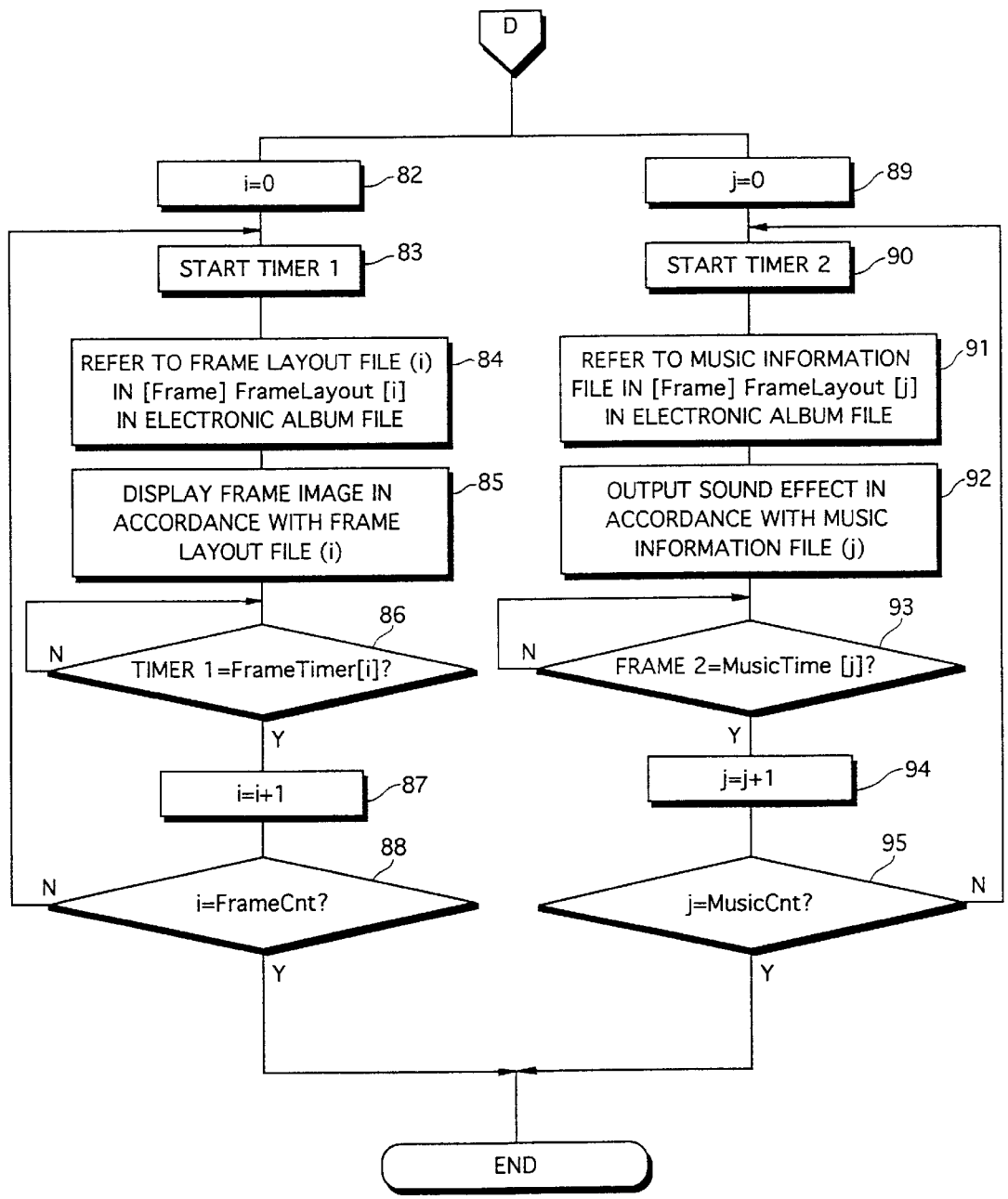

FIGS. 18 and 19 illustrate examples of windows displayed on the display device 19 of the client computer 1. FIGS. 20 to 22 are flow charts showing the detailed procedure for viewing the electronic album.

When the client computer 1 and the image server 30 are connected to each other, to view the electronic album, the electronic album information (thumbnail images of the cover pages of the electronic albums) is transmitted from the image server 30 to the client computer 1, as described above. An album selection window is displayed on the display device 19 of the client computer 1 in accordance with the electronic album information.

The album selection window includes an album list display area A41 in which a list of the images of the cover pages of electronic albums is displayed on the basis of frame thumbnail images (the file name or the like of an electronic album may be displayed), an area for selecting the image server 30 (which will be clicked by the user when the image server 30 is changed), a viewing area clicked by the user when the selected electronic album is viewed, a printing area clicked by the user when a frame image of the electronic album is printed, and a selection area (end area) clicked by the user when the electronic album is selected.

An image which is desired to be viewed by the user out of the images of the cover pages of the electronic albums which are displayed in the album list display area A41 is clicked. If the selected electronic album is one desired to be viewed, the selection area (end area) is clicked. The selection area is clicked, so that an album content display window shown in FIG. 19 is displayed on the display device 19 of the client computer 1.

The album content display window includes a thumbnail image list display area A42 in which a list of thumbnail images of frame images constituting the electronic album selected by the user is displayed. The album content display window also includes a server selection area, a reading area, a printing area, and a selection area, similarly to the album selection window shown in FIG. 18.

The list of the thumbnail images of the frame images constituting the electronic album selected by the user is displayed in the area A42, so that the contents of the selected electronic album can be confirmed. When the selection area (end area) is clicked by the user in the album content display window shown in FIG. 19, the electronic album to be read is finally determined.

When the electronic album to be viewed is determined (step 60), the file name of the determined electronic album is transmitted from the client computer 1 to the image server 30. Consequently, an electronic album file relating to the electronic album which is determined to be viewed is transmitted from the image server 30, and is downloaded to the client computer 1 (step 61).

An album information management folder is generated in the client computer 1. The electronic album file downloaded from the image server 30 is stored in the generated album information management folder (step 62). A frame image page i is then reset (step 63).

A frame layout file on the first page is downloaded from the image server 30 while referring to a path to the frame layout file stored in the electronic album file (step 64). A frame management folder is generated, and the downloaded frame layout file is stored in the generated frame management folder (step 65). When the frame layout file is stored in the frame management folder in the client computer 1, the path to the frame layout file on the first page stored in the electronic album file is changed to a path to the frame layout file stored in the frame management folder in the client computer 1 (step 66).

Image data representing each of the objects constituting the frame image on the first page is downloaded from the image server 30 while referring to a path to the object described in the frame layout file (step 67). It goes without saying that image data which has already been stored in the client computer 1 is not downloaded from the image server 30.

An object management folder is generated in the frame management folder, and each of the downloaded object files is stored therein (step 68). The path to each of the objects described in the frame layout file is changed into a path to each of object files stored in the object management folder (step 69).

The frame image page i is incremented (step 70), and the processing at the steps 64 to 70 is repeated until the frame image page i is the frame image page of the final one of the frame images constituting the electronic album (step 71).

A play order number j representing the order in which sound effects are played is then reset (step 72).

A music information file is downloaded from the image server 30 while referring to a path to the music information file described in the electronic album file (step 73). A music management folder is generated in the album information management folder. The downloaded music information file is stored in the generated music management folder (step 74). When the music information file is stored in the music management folder, the path to the music information file described in the electronic album file is changed into a path to the music information file stored in the music management folder (step 75).

A sound effect file is downloaded from the image server 30 while referring to the path to the sound effect file described in the music information file (step 76). Also in this case, it goes without saying that the sound effect file stored in the client computer 1 need not be downloaded from the image server 30. The downloaded sound effect file is stored in the music management holder (step 77). The path to the sound effect file described in the music information file is changed into a path to the sound effect file stored in the music management holder (step 78).

The play order number j is incremented (step 79), and the processing at the steps 73 to 79 is repeated until the play order number j is the final play order number (step 80).

As described in the foregoing, the electronic album file, frame layout file, object image data, music information file and sound effect file for viewing the electronic album are stored in the client computer 1 in the same configuration as that shown in FIG. 16.

When the play order number j is the final play order number, the reading of the electronic album is started. In the reading of the electronic album, the display of the frame image (steps 82 to 88) and the play of the sound effect (steps 89 to 94) are performed in parallel.

In the display of the frame image, the frame image page i is reset (step 82), and a first timer is started (step 83). A frame layout file is read while referring to a path to the frame layout file described in the electronic album file (step 84). A frame image on the first page is constructed on the basis of the read frame layout file, so that the frame image on the first page is displayed on the display device 19 of the client computer 1 (step 85). The frame image on the first page is displayed on the display device 19 during the display time specified by FrameTimer described in the electronic album file (step 86). When the display time is measured by the first timer, the frame image page i is incremented (step 87). The processing at the steps 83 to 87 is repeated until the frame image page i is the final frame image page (step 88). It goes without saying that the first timer is reset each time display of the frame image page terminates.

In the output of the sound effect, the play order number j is reset (step 89), and a second timer is started (step 90). A path to a music information file described in the electronic album file is referred to, to read the music information file (step 91). A sound effect file is read out in accordance with the music information file, so that a sound effect is outputted (step 92). When the second timer measures the play time described in the music information file (step 93), the play order number j is incremented (step 94). The processing at the steps 90 to 94 is repeated until the output of the final sound effect ends (step 95).

Figure 23:
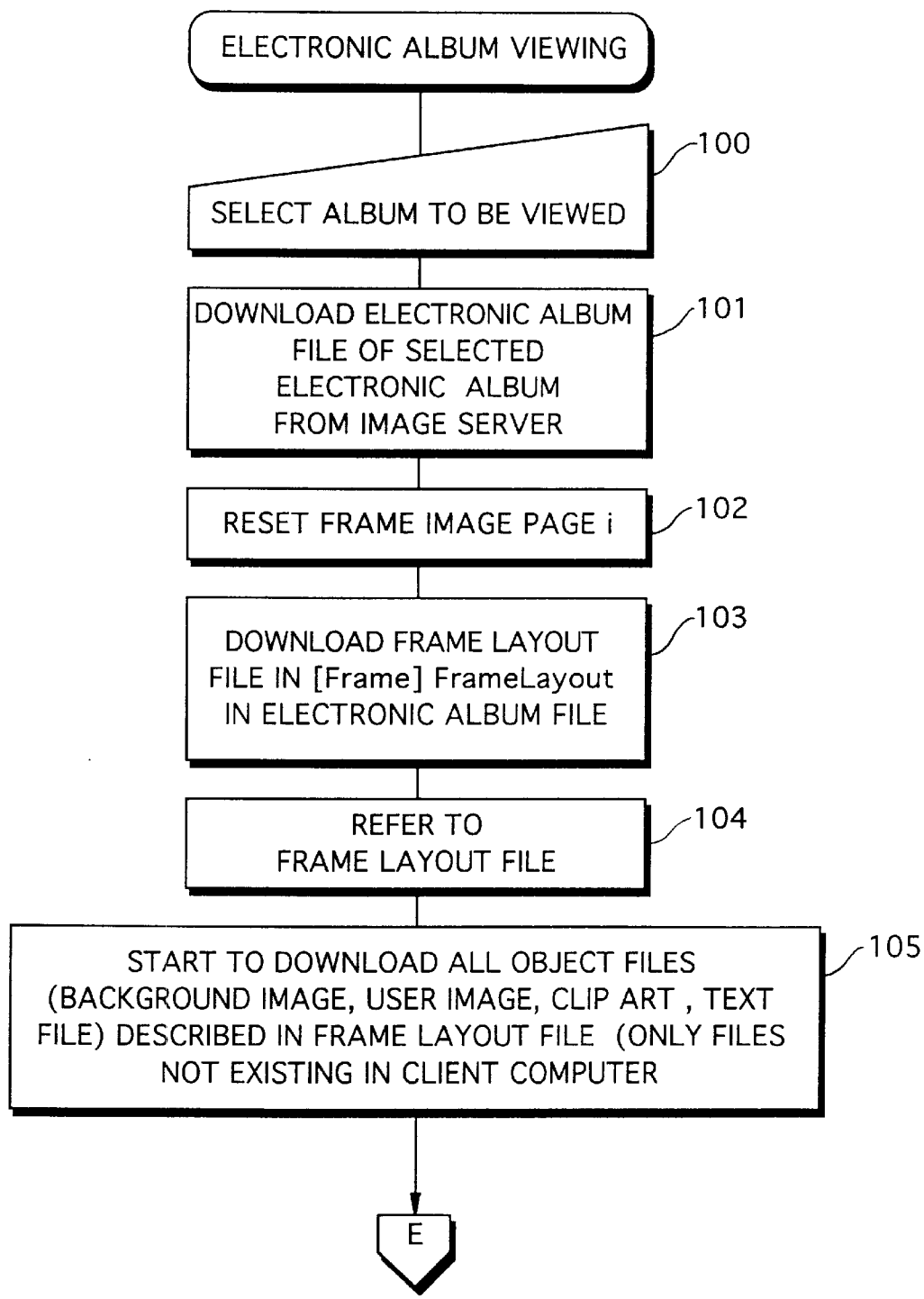
FIGS. 23 and 24 are flow charts showing the detailed another procedure for viewing an electronic album.
Figure 24:
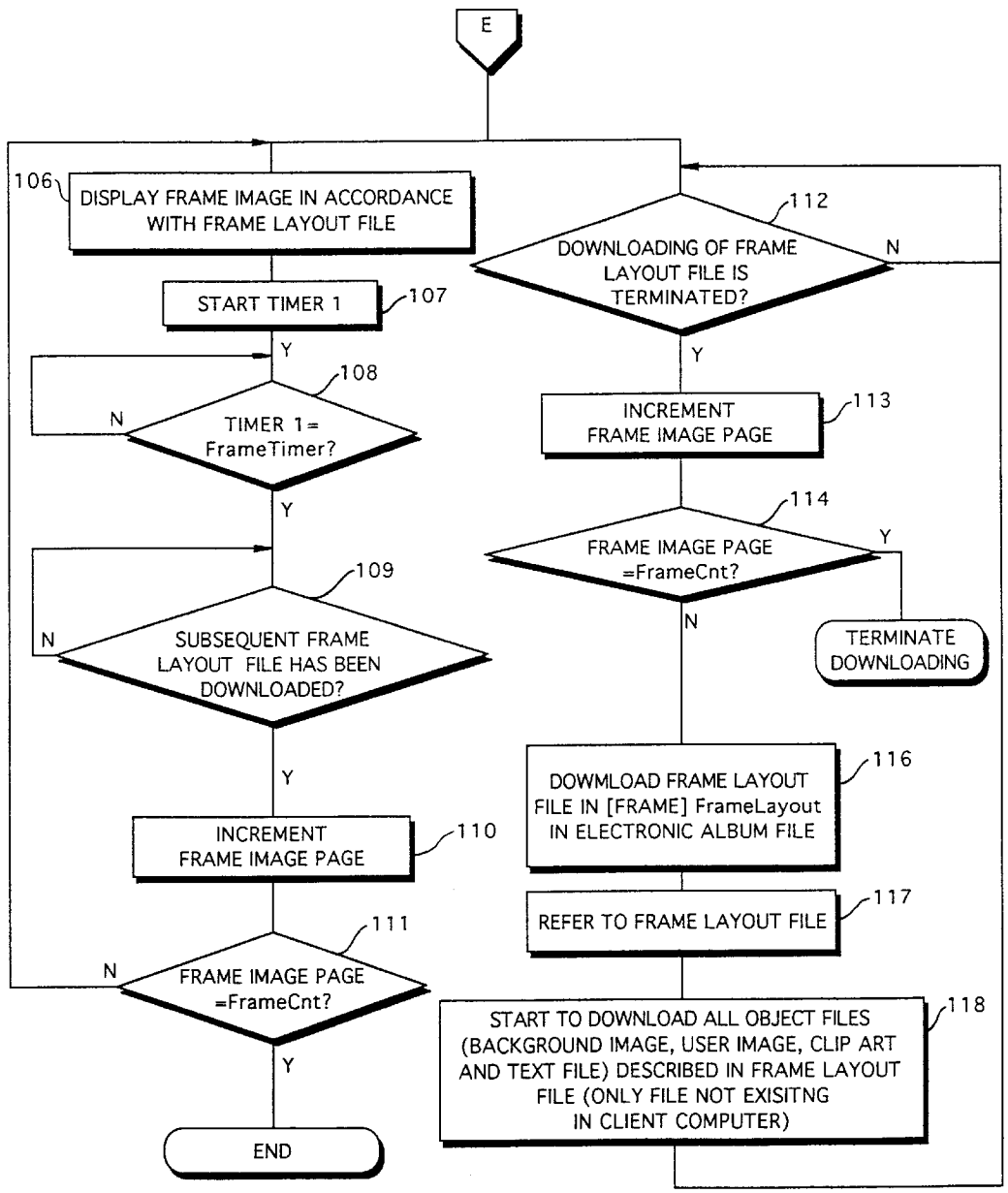

Although in processing shown in FIGS. 20 to 22, the reviewing of the electronic album is started after all data required to view the electronic album are downloaded to the client computer 1, the electronic album can be also viewed while downloading the data required to view the electronic album. The procedure for processing in this case is shown in FIGS. 23 and 24. At this time, the output of the sound effect is omitted.

An electronic album to be viewed by the user of the client computer 1 is first selected (step 100). Data representing the file name of the selected electronic album is transmitted from the client computer 1 to the image server 30. An electronic album file relating to the selected electronic album is downloaded to the client computer 1 from the image server 30 (step 101). The frame image page i is reset (step 102).

A frame layout file on the first page is downloaded from the image server 30 while referring to a path to the frame layout file described in the electronic album file (step 103). The frame layout file is referred to (step 104), and object files constituting the frame image on the first page described in the frame layout file are downloaded from the image server 30 (step 105). It goes without saying that a file which has already existed in the client computer 1 need not be downloaded.

The display of the frame image (steps 106 to 111) and the downloading of various types of files for displaying the frame image (steps 112 to 118) are performed in parallel.

In the downloading of the files, the frame layout files are downloaded in the order of display. When the downloading of a frame layout file relating to a frame image on a page is terminated, the downloading of a frame layout file relating to the subsequent frame image is started (step 112). When the downloading of the frame layout file is terminated, the frame image page i is incremented (step 113). When the frame image page is the final page, the downloading processing of the file is terminated (step 114).

If the frame image page is not the final page (step 114), the frame layout file for the next frame image is downloaded from the image server 30 (step 116). The downloaded frame layout file is referred to (step 117), and all object files constituting the frame image are downloaded from the image server 30, as required (step 118).

Image data representing each of the objects downloaded to the client computer 1 from the image server 30 may be one stored in the low resolution file of the image server 30. Since low resolution image data is downloaded from the image server 30, time required for the downloading is shortened. It is possible to prevent the situations where the downloading of the image data representing each of the objects constituting the subsequent frame image is not terminated within the display time for the preceding frame image.

In the display of the frame image, the frame image is constructed in accordance with the frame layout file concerning the frame layout page k (<i), which has been downloaded, and is displayed on the display device 19 of the client computer 1 (step 106). The first timer is started (step 107), and the frame image is displayed during the display time described in the electronic album file (step 108). When the display time elapsed, it is confirmed whether or not the downloading of a frame layout file relating to a frame image in the subsequent frame is terminated (step 109). If the subsequent frame layout file has been downloaded, the frame image page k is incremented (step 110). The processing at the steps 106 to 110 is repeated until the final frame image page is displayed (step 111).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic album system comprising:

an image server; and a plurality of client computers for establishing data communication with each other, wherein frame image specific data for specifying a plurality of frame images and display order data representing an order in which the frame images are displayed are transmitted from a client computer to said image server, and wherein an electronic album file including said frame image specific data and said display order data are, in response to a request to transmit the electronic album file from said client computer transmitted from said image server to said client computer which has issued the request, and wherein said client computer comprises image data transmission requesting means for requesting said image server to transmit frame image data which said client computer does not have therein, the frame image data representing the frame image specified by frame image specific data included in an electronic album file which has been transmitted from said image server, and wherein said image server comprises frame image data transmission means for transmitting, in response to the request, the requested frame image data to said client computer which has requested to transmit the frame image data.

2. The electronic album system according to claim 1, wherein said client computer issues a request for viewing an electronic album to said image server, wherein said image server comprises display list data transmission means for transmitting, in response to the request for viewing the electronic album, data for displaying a list of a plurality of representative images representing outlines of a plurality of electronic albums to said client computer which has issued the request, wherein said client computer comprises:

designating means for designating a selected representative image out of the list of the representative images which are represented by the list display data transmitted from said image server; and representative image specifying data transmission means for transmitting data specifying the representative image designated by said designating means, said image server transmitting to said client computer an electronic album corresponding to the representative image specified by the representative image specifying data which has been transmitted from said client computer.

3. An electronic album image server for establishing data communication with a plurality of client computers, comprising:

receiving means for receiving frame image specific data for specifying a plurality of frame images and display order data representing an order in which the frame images are displayed which are transmitted from one of said client computers and are correlated with each other;

electronic album file transmission means for transmitting an electronic album file including frame image specific data and display order data, in response to a request to transmit the electronic album file from the one or other client computer, to said client computer which has issued the request; and image data transmission means for transmitting to said client computer, which has issued said request to transmit the electronic album file frame, image data representing the frame images specified by frame specific data included in the electronic album file in response to a request to transmit the frame image data from said client computer which has issued said request to transmit the electronic album file.

4. An electronic album producing client computer for establishing data communication with an image server, comprising:

frame image selection means for selecting a plurality of frame images comprising an electronic album;

display order determination means for determining an order in which the plurality of frame images selected by said frame image selection means are displayed; and electronic album file creating means for correlating frame image specific data for specifying the plurality of frame images selected by said frame image selection means and display order data representing the order determined by said display order determination means with each other, and creating an electronic album file which includes the frame image specific data and the display order data.

5. The client computer according to claim 4, further comprising transmission means for transmitting the created electronic album file to said image server.

6. The client computer according to claim 5, further comprising:

time data transmission means for transmitting at least one of frame image display time data representing a time period during which a frame image is displayed and electronic album display time data representing a time period during which the electronic album is displayed upon correlating with the frame image specific data and the display order data to said image server.

7. The client computer according to claim 5, further comprising:

display effect designation data transmission means for transmitting display effect designation data for designating a way in which the frame image or images comprising the frame image appears upon correlating with the frame image specific data and the display order data to said image server.

8. The client computer according to claim 7, further comprising:

simulation display control means for controlling a display device such that a simulation display based on the way of appearance is performed.

9. The client computer according to claim 4, further comprising:

sound data transmission means for transmitting sound data representing a sound effect of the electronic album upon correlating with the frame image specific data and the display order data to said image server.

10. The client computer according to claim 9, wherein said sound data represents a plurality of sound effects, further comprising:

sound-related data transmission means for transmitting at least one of data representing a start and an end of play of each sound of a set of sounds, data representing a number of times of repetition of the set of sounds, and data representing a time period during which a fade-in effect is added at a time of the start of the play of a sound and a time period during which a fade-out effect is added at the time of the start of the play of the sound upon correlating with the frame image specific data and the display order data to said image server.

11. An electronic album viewing client computer for establishing data communication with an image server, comprising:

electronic album file receiving means for receiving from said image server an electronic album file including frame image specific data for specifying a plurality of frame images comprising an electronic album and display order data representing an order in which the frame images are displayed;

image data download means for downloading from said image server, of frame image data representing the plurality of frame images specified by the frame image specific data received by said electronic album file receiving means, frame image data which is not stored in said client computer; and first electronic album display control means for controlling a display device such that the images represented by the frame image data stored in said client computer and the frame image data downloaded by said image data download means are displayed in accordance with the display order data.

12. The client computer according to claim 11, wherein display time data, representing a time period during which a frame image is displayed, is stored in the electronic album file, said client computer further comprising:

display switching means for switching the display of the frame images represented by the frame image data in accordance with the display time data.

13. The client computer according to claim 11, wherein display effect designation data for designating a display effect, representing a way in which the frame image or images comprising the frame image appears, is stored in the electronic album file, further comprising:

display effect control means for displaying the frame image or the images comprising the frame image on the basis of the display effect designation data.

14. The client computer according to claim 11, wherein sound data representing a sound effect of the electronic album is stored in the electronic album, said client computer further comprising:

means for outputting a sound represented by the sound data.

15. The client computer according to claim 14, wherein the sound data represents a plurality of sound effects, at least one of play start and end data representing a start and an end of play of each sound of the plurality of sound effects, repetition number data representing a number of times of repetition of a set of the plurality of sound effects, and fade-in-out data representing a time period during which a fade-in effect is added at a time of the start of the play of a sound and a time period during which a fade-out effect is added at the time of the start of the play of the sound is stored in the electronic album file, said client computer further comprising:

play control means for controlling the start and the end of the play of each of the sounds in accordance with the play start and end data;

repetition control means for repeating the sounds comprising the plurality of sound effects in accordance with the repetition number; and fade-in-out control means for controlling the play such that the fade-in effect and the fade-out effect are added in accordance with the fade-in-out data.

16. The client computer according to claim 11, wherein said image data download means downloads, while a preceding frame image is being displayed, frame image data based on which a frame image is subsequently displayed from said image server.

17. In an electronic album system comprising an image server and a plurality of client computers for establishing data communication with each other, a method of controlling said electronic album system, comprising:

correlating frame image specific data for specifying a plurality of frame images and display order data representing an order in which the frame images are displayed with each other and transmitting the frame image specific data and the display order data to said image server from said client computer;

transmitting an electronic album file including frame image specific data and display order data, in response to a request to transmit electronic album file from said client computer, to said client computer which has issued the request from said image server;

issuing, from said client computer which has requested to transmit the electronic album file to said image server, when said client computer does not store frame image data representing a frame image specified by the frame image specific data which is included in the electronic album file transmitted from said image server, a request to transmit the frame image data; and transmitting, to said client computer from said image server, frame image data representing the frame image comprising the electronic album file in response to the request to transmit the frame image data from said client computer.

18. In an image server for establish at a communication with a plurality of client computers, a method of controlling operation of an electronic album image server, comprising:

receiving frame image specific data for specifying a plurality of frame images and display order data representing an order in which the frame images are displayed which are transmitted from one of said client computers and are correlated with each other;

transmitting an electronic album file including the frame image specific data and the display order data, in response to a request to transmit the electronic album file from the one or other client computer, to said client computer which has issued the request; and transmitting, to said client computer which has issued said request to transmit the electronic album file, frame image data representing the frame image specified by the frame image specific data included in the electronic album file in response to a request to transmit the frame image data from said client computer which has issued said request to transmit the electronic album file.

19. In a client computer for establishing data communication with an image server, a method of controlling operation of an electronic album producing client computer, comprising:

selecting a plurality of frame images comprising an electronic album;

determining an order in which the selected plurality of frame images are displayed; and correlating frame image specific data for specifying the selected plurality of frame images and display order data representing the determined order in which the frame images are displayed with each other to create an electronic album file.

20. In a client computer for establishing data communication with an image server, a method of controlling operation of an electronic album viewing client computer, comprising:

receiving, from said image server, an electronic album file including frame image specific data for specifying a plurality of frame images comprising an electronic album and display order data representing an order in which the frame images are displayed;

downloading from said image server, of frame image data representing frame images specified by the received frame image specific data, frame image data which is not stored in said client computer; and displaying the frame images represented by frame image data which is stored in said client computer and the downloaded frame image data in accordance with the display order data.

21. A recording medium storing a program for controlling a client computer for establishing data communication with an image server so as to:

select a plurality of frame images comprising an electronic album;

determine an order in which the selected plurality of frame images are displayed; and correlate frame image specific data for specifying the selected plurality of frame images and display order data representing the determined order in which the frame images are displayed with each other to create an electronic album file.

22. A recording medium storing a program for controlling a client computer for establishing data communication with an image server so as to:

receive from said image server an electronic album file including frame image specific data for specifying a plurality of frame images comprising an electronic album and display order data representing an order in which the frame images are displayed;

download from said image server, of frame image data representing frame images specified by the received frame image specific data, frame image data which is not stored in said client computer; and display the images represented by frame image data stored in said client computer and the downloaded frame image data in accordance with the display order data.

* * * * *